United States Patent
Perez Alvarez et al.

(10) Patent No.: US 11,068,242 B2
(45) Date of Patent: Jul. 20, 2021

(54) METHOD AND SYSTEM FOR GENERATING AND EXECUTING CLIENT/SERVER APPLICATIONS

(71) Applicant: Naver Corporation, Gyeonggi-do (KR)

(72) Inventors: Jose Miguel Perez Alvarez, Seville (ES); Adrian Mos, Meylan (FR)

(73) Assignee: Naver Corporation

( * ) Notice: Subject to any disclaimer, the term of this patent is extended or adjusted under 35 U.S.C. 154(b) by 0 days.

(21) Appl. No.: 16/875,764

(22) Filed: May 15, 2020

(65) Prior Publication Data
US 2021/0182033 A1    Jun. 17, 2021

Related U.S. Application Data

(60) Provisional application No. 62/948,429, filed on Dec. 16, 2019.

(51) Int. Cl.
*G06F 8/35* (2018.01)
*G06F 8/38* (2018.01)
(Continued)

(52) U.S. Cl.
CPC .............. *G06F 8/35* (2013.01); *G06F 8/20* (2013.01); *G06F 8/38* (2013.01); *G06F 16/252* (2019.01); *H04L 67/1097* (2013.01)

(58) Field of Classification Search
None
See application file for complete search history.

(56) References Cited

U.S. PATENT DOCUMENTS 9,021,420 B2    4/2015  Jacquin et al.
9,851,968 B2 *  12/2017 Straub ..................... G06F 8/20
(Continued)

OTHER PUBLICATIONS

Aalst, Van Der, W. M. P. "Pattern and XPDL: a critical evaluation of the XML process definition language", QUT Technical Report FIT-TR; vol. 2003-06, Queensland University of Technology, 2003.
(Continued)

*Primary Examiner* — Philip Wang
*Assistant Examiner* — Rongfa P Wang

(57) ABSTRACT

There is provided an improvement for developing an application between an application server and one of multiple client devices where the application server is disposed remotely of the one of multiple client devices. In one example, an application behavior model (ABM) is produced and stored at the application server. Using an output corresponding with the one of multiple devices, program code for a client application is produced from a selected one of several configurable templates. Selected input, generated with the ABM and the program code, is received at the application server to cause a sequence of processing steps to be performed with the application server. In another example, the ABM is received at the one of multiple client devices, the one of multiple client devices including a user interface (UI). The ABM and client application are used to render a first page at the UI for providing an action identifier. The action identifier is sent to the application server for causing a sequence of processing steps to be performed with the application server. Pursuant to performing the sequence of processing steps, the ABM and client application conjunctively cause a second page to be rendered on the UI.

14 Claims, 20 Drawing Sheets

(51) Int. Cl.
  *G06F 16/25*  (2019.01)
  *H04L 29/08*  (2006.01)
  *G06F 8/20*  (2018.01)

(56) References Cited

U.S. PATENT DOCUMENTS

| | | | | |
|---|---|---|---|---|
| 10,318,265 | B1* | 6/2019 | To | H04L 67/34 |
| 2008/0010534 | A1* | 1/2008 | Athale | G06F 9/451 |
| | | | | 714/38.14 |
| 2012/0036494 | A1 | 2/2012 | Gurumohan et al. | |
| 2014/0109072 | A1* | 4/2014 | Lang | G06F 8/72 |
| | | | | 717/168 |
| 2015/0319252 | A1* | 11/2015 | Momchilov | H04L 67/146 |
| | | | | 709/223 |
| 2016/0139888 | A1 | 5/2016 | Iyer et al. | |
| 2017/0131978 | A1* | 5/2017 | Iyer | G06F 3/0486 |
| 2017/0264566 | A1* | 9/2017 | Namboodiri | G06F 9/5044 |
| 2018/0039921 | A1 | 2/2018 | Mos | |
| 2018/0349778 | A1* | 12/2018 | Perez Ivarez | G06F 16/2379 |
| 2018/0349812 | A1* | 12/2018 | Alvarez | G06Q 10/067 |

OTHER PUBLICATIONS

Aalst, Van Der, Wil; and Hofstede, Ter, Arthur. "YAWL: Yet Another Workflow Language". Information Systems, vol. 30, pp. 245-275, 2005. Revised Version available at eprints.qut.edu.au.

Acerbis, Roberto; Bongio, Aldo; Brambilla, Marco; and Butti, Stefano. "Model-Driven Development of Cross-Platform Mobile Applications with Web Ratio and IFML". In 2015 2nd ACM International Conference on Mobile Software Engineering and Systems, pp. 170-171. Florence, Italy: IEEE, 2015.

Alfresco Process Services (BPM), Hyland Software, web page available on the Internet at alfresco.com/bpm-software, 2019 recovered 2021.

Appypie, "App builder to make an app without coding", available on the Internet Mar. 31, 2019 at appypie.com, recovered at web.archive.org/web/20190331164525/https://www.appypie.com/.

Barker, Dean, "Web Content Management, Systems, Features and Best Practices", O'Reilly Media, Inc., 2016, with specific reference to Chapter 1.

Bocciarelli, Paolo; and D'Ambrogio, Andrea. "A BPMN Extension for Modeling Non Functional Properties of Business Processes", in Proceedings of the 2011 Symposium on Theory of Modeling & Simulation: DEVS Integrative M&S Symposium, Apr. 2011, pp. 160-168.

Boldt, Nick; and Steinberg, Dave, "Introduction to the Eclipse Modeling Framework" available on the Internet at eclipse.org/modeling/emf/docs/presentations/EclipseCon/ EclipseCon2006_EMF_Intro.pdf, Mar. 20, 2006.

Bonitasoft, "Reinvent and automate your business processes", available on the Internet Nov. 17, 2019 at bonitasoft.com, recovered at web.archive.org/web/20191117021203/https://www.bonitasoft.com/.

Brambilla, Marco; Piero Fraternali; and Carmen Karina Vaca Ruiz. "Combining Social Web and BPM for Improving Enterprise Performances: The BPM4People Approach to Social BPM", WWW 2012 Companion, European Projects Track, Apr. 16-20, 2012, Lyon France.

Braun, Richard; and Esswein, Werner. "Classification of Domain-Specific BPMN Extensions", Conference: The Practice of Enterprise Modeling, Lecture Notes in Business Information Processing, vol. 197, pp. 42-57. Springer, Berlin, Heidelberg, 2014.

Brown, Alan W.; Conallen, Jim; and Tropeano, Dave, "Introduction: Models, Modeling, and Model-Driven Architecture (MDA)", pp. 1-16 in Beydeda, Sami; Book, Matthias; and Gruhn, Volker, "Model-Driven Software Development", Springer-Verlag, 2005.

Bubble, "Investing in Bubble startups", Oct. 23, 2019, available at bubble.io/investordescription.pdf.

Bunder, Hendrick, "Building Domain-specific Languages with Xtext and Xtend", itemis Blog available on the Internet at blogs.itemis.com/en/building-domain-specific-languages-with-xtext-and-xtend, 2018.

"Business Process Model and Notation (BPMN)", Version 2, Jan. 2011, available on the Internet at omg.org/spec/BPMN/2.0/PDF.

Dumas, Marlon; La Rosa, Marcello; Mendling, Jan; Reijers, Hajo A., "Fundamentals of Business Process Management", Springer-Verlag, 2013, with specific reference to Chapter 1.

Eisenman, Bonnie. "Learning React Native: Building Native Mobile Apps with JavaScript", O'Reilly Media; 2nd edition, Nov. 21, 2017, with specific reference to Chapter 1.

El-Kassas, Wafaa S.; Abdullah, Bassem A.; Yousef, Ahmed H.; and Wahba, Ayman M. "Taxonomy of Cross-Platform Mobile Applications Development Approaches", Ain Shams Engineering Journal, vol. 8, Issue 2, pp. 163-190, 2017.

Gartner Press Release, "Gartner Says by 2018, More Than 50 Percent of Users Will Use a Tablet or Smartphone First for All Online Activities", Dec. 8, 2014, available on the Internet at gartner.com/en/newsroom/press-releases/2014-12-08-gartner-says-by-2018-more-than-50-percent-of-users-will-use-a-tablet-or-smartphone-first-for-all-online-activities.

"JBPM Documentation", Version 6.5.0.Final available on the Internet at docs.jboss.org/jbpm/release/6.5.0.Final/jbpm-docs/pdf/jbpm-docs.pdf, 2016, with specific reference to Chapter 1.

Lunny, Andrew, "PhoneGap Beginner's Guide", Published by Packt Publishing Ltd., Sep. 2011, with specific reference to Chapter 2.

Moore, Caroline "New Premium Themes: Small Business and Photo Blog", Dec. 7, 2017, available on the Internet at wordpress.com/blog/2017/12/07/small-business-photo-blog/.

Mos, Adrian; and Cortes-Cornax, Mario. "Business Matter Experts do Matter: A Model-Driven Approach for Domain Specific Process Design and Monitoring", published on arXiv.org as 1606.04287, Jun. 14, 2016.

Mos, Adrian; and Cortes-Cornax, Mario. "Generating Domain-Specific Process Studios", 2016 IEEE 20th International Enterprise Distributed Object Computing Conference (EDOC), Vienna, pp. 1-10, 2016.

Mos, Adrian; Cortes-Cornax, Mario; Pérez-Álvarez, José Miguel; Gómez-López, Maria Teresa. "A Model-Driven Framework for Domain Specific Process Design and Governance". Proceedings of the Demo Track and Dissertation Award of the 15th International Conference on Business Process Modeling (BPM 2017), Barcelona, Spain, Sep. 13, 2017.

Murata, Tadao. "Petri Nets: Properties, Analysis and Applications". Proceedings of the IEEE vol. 77, No. 4, pp. 541-580, Apr. 1989.

OASIS Standard, "Web Services Business Process Execution Language Version 2.0, available on the Internet at docs.oasis-open.org/wsbpel/2.0/OS/wsbpel-v2.0-OS.pdf, Apr. 11, 2007", with specific reference to Chapters 1 and 5.

Object Management Group, "Model Driven Architecture (MDA): The MDA Guide Rev 2.0", available at omg.org/cgi-bin/doc?ormsc/14-06-01, Jun. 2014.

OpenESB, "OpenESB: Manage our services in a smart way", available on the Internet Dec. 2, 2019 at open-esb.net, recovered at web.archive.org/web/20191202021903/http://www.open-esb.net/.

Oracle Fusion Middleware Modeling and Implementation Guide for Oracle Business Process Management, 11g Release 1 (11.1.1), available on the Internet at docs.oracle.com/cd/E14571_01/doc.1111/e15176.pdf, Jul. 2010, with specific reference to Chapter 1.

Reynolds, Mark. "Xamarin Mobile Application Development for Android", PACKT Publishing, Jan. 14, 2014, with specific reference to Chapter 2.

Rieger, Christoph; and Kuchen, Herbert. "A Process-Oriented Modeling Approach for Graphical Development of Mobile Business Apps". Computer Languages, Systems & Structures, vol. 53, pp. 43-58, Sep. 2018.

Rodriguez, Alfonso; Fernández-Medina, Eduardo; and Piattini, Mario, "A BPMN Extension for the Modeling of Security Requirements in Business Processes", IEICE Transactions on Information and Systems vol. E90-D, No. 4, pp. 745-752, Apr. 2007.

Rouly, Jean Michel; Orbeck, Jonathan D; and Syriani, Eugene. "Usability and Suitability Survey of Features in Visual IDEs for

(56) References Cited

OTHER PUBLICATIONS

Non-Programmers", PLATEAU '14: Proceedings of the 5th Workshop on Evaluation and Usability of Programming Languages and Tools, pp. 31-42, Oct. 2014.

Shin, Sang, "Open ESB", available on the Internet at docs.huihoo.com/openesb/openesbGlassFish.pdf, 2007.

Thunkable, "Build your own apps", available on the Internet Jul. 11, 2019 at thunkable.com, recovered at web.archive.org/web/20190711224302/https://thunkable.com/#/.

Thunkable, "What is Thunkable?", available on the Internet Jan. 18, 2019 at docs.thunkable.com, recovered at web.archive.org/web/20190118064826/https://docs.thunkable.com/.

Visual Paradigm, "UML Association vs Aggregation vs Composition", available on the Internet at visual-paradigm.com/guide/uml-unified-modeling-language/uml-aggregation-vs-composition, 2020 recovered in 2021.

Wargo, John M. "Apache Cordova API Cookbook". Chapter 1, "Introduction to Apache Cordova", Addison-Wesley Professional, 1st ed., pp. 1-17, 2014.

\* cited by examiner

METHOD AND SYSTEM FOR GENERATING AND EXECUTING CLIENT/SERVER APPLICATIONS

PRIORITY INFORMATION

The present application claims priority, under 35 USC § 119(e), from U.S. Provisional Patent Application, Ser. No. 62/948,429, filed on Dec. 16, 2019. The entire content of U.S. Provisional Patent Application, Ser. No. 62/948,429, filed on Dec. 16, 2019, is hereby incorporated by reference.

FIELD

The present disclosure is generally related to development and operation of an application for one or more client devices, and more particularly to methods for both generating and executing the application where the execution is achieved through cooperative interaction between an application server and a client device, and where the application server is disposed remotely of the client device.

BACKGROUND

Generally, applications installed in a target platform (i.e., the hardware and/or software environment on or with which an application is developed to operate) are configured to execute a predefined program whenever predefined events occur at the target platform. For instance, when a user of the target platform with a screen (e.g., computer) clicks on some button in a page of the application displayed on a screen, the application performs a specific process implemented in the application.

However, the behavior of an application may change over time. For instance, the graphical user interface (GUI) of the application may be redesigned, such that the button triggering execution of a particular process may change how a client program for the application interacts with a server program for the application. Such GUI redesigns may include additional, alternate or fewer modes of input and output.

When such change occurs, a new version of the client program for the application is recompiled for each target platform and subsequently distributed to and installed on client devices of each target platform (e.g., mobile phones running Android and iOS operating systems each have a specifically compiled client application), which may be time consuming, cumbersome, and costly. Accordingly, there remains a need for improved methods and systems which address these limitations.

SUMMARY

In one embodiment there is disclosed a first method with the first method being used to generate an application for use by an end user. The end user is associated with at least one of a first device and a second device with the at least one of the first device and the second device possessing respective functional capability sets. The method comprises: producing an application behavior model (ABM) where the ABM includes information regarding organization of the application and actions available for request by the end user; storing the ABM at an application space in an application server, wherein the application server, which includes an application execution engine, communicates remotely with the at least one of the first device and the second device to which the end user is associated; producing instructions for modelling one or more aspects of generating a client application, the producing of the instructions for modelling including providing an output (GMo) where the GMo corresponds with the at least one of the first device and the second devices to which the end user is associated; using the GMo to select an application template from a repository including a first application template and a second application template, the first and second application templates corresponding respectively with the first and second devices, wherein functional capability set of the first device differs from the functional capability set of the second device, and wherein the first application template is configured to accommodate for the functional capability set of the first device and the second application template is configured to accommodate for the functional capability set of the second device; instantiating the selected one of the first and second application templates to produce program code, the program code corresponding with a client application; launching the program code of the client application at the at least one of first device and second device to which the end user is associated; and wherein the application execution engine and the at least one of the first device and the second device to which the end user is associated cooperatively use the ABM and the client application to execute the application.

In one example of the first method, the execution engine is associated with a flow to be implemented during execution of the application and the ABM does not contain any code instructions relating to the process flow, wherein the producing the ABM includes providing the ABM with at least one reference to the flow. In another example of the first method, the producing the ABM includes providing the ABM with data corresponding with output elements to be rendered at the at least one of the first device and the second device. In yet another example of the first method, the end user may or may not have access to a screen, wherein the first application template is configured to interact with the end user by way of a screen and the second application template is configured to interact with the end user lacking access to a screen. In yet another example of the first method, the end user may or may not have access to a screen, wherein the first application template is configured to interact with the end user by way of a screen and the second application template is configured to interact with the end user lacking access to a screen.

In yet another example of the first method, the second application template is selected from the repository and the end user interacts with the at least one of the first device and second device by way of a user interface, wherein the user interface comprises a voice based subsystem permitting the end user to communicate with the at least one of the first device and second device by way of speech related input/output. In yet another example of the method, the ABM comprises a first ABM having first content with information regarding organization of the application and actions available to the end user and a second ABM having second content with information regarding the organization of the application and actions available to the end user, wherein at least part of the content differs from at least part of the second content, and wherein the first ABM is replaced with the second ABM. In yet another example of the first method, database support is provided for the application server, and the first method includes monitoring, controlling and updating behavior of the application with the database support.

In another embodiment there is disclosed a second method. In the second method an application is used by an end user where an application server communicates with a user interface of a client device for executing the application. The second method comprises: sending an application behavior model (ABM) to the client device responsive to receiving a request from the user interface of the client device, the ABM (1) contains references to process flows and data types, and (2) specifies how the client application is to interact with a user of the client device; using the ABM to direct the client application as to how a first page is to be rendered with the user interface; providing an action identifier with the first page; responsive to the providing the action identifier, launching performance of a sequence of processing steps at the application server; pursuant to performing the sequence of processing steps at the application server, sending an instruction to the client device, the instruction requesting data to be either provided by the client device or collected by the client device; and after sending the action identifier to the application server, using the ABM, in conjunction with the client application, to render a second page on the user interface.

In one example of the second method, the receiving the request from the client device comprises receiving an application token from the client device; the application token being produced by the client application when initially launched on the client device and being associated with a sequence of execution instructions that are performed on the application server. In another example of the second method, the using the ABM, in conjunction with the client application, to render the first page includes rendering the first page in the form of a screen rendering for output to a display or in the form of a synthesized voice rendering for output to a speaker. In yet another example of the second method, the first page comprises a screen having a graphical element and wherein the end user inputs the action identifier with the graphical element. In yet another example of the second method, the client application includes a behavior, wherein multiple aspects of the behavior of the client application vary as a function of the ABM.

In yet another example of the second method, each data type is one or more of a location, date, string, float, integer, image, and Boolean. In yet another example of the second method, the data collected by the client device is obtained from a device disposed remotely of the client device. In another example of the second method, each data type has code associated with its handling at the client device.

In yet another embodiment there is disclosed a system for generating an application for use by an end user, the end user being associated with at least one of a first device and a second device where the at least one of the first device and the second device possess respective functional capability sets and where the functional capability set of the first device differs from the functional capability set of the second device. The system comprises: means for producing an application behavior model (ABM) where the ABM includes information regarding organization of the application and actions available for request by the end user; an application server, the application server including an application execution engine and communicating remotely with the at least one of first device and second device to which the end user is associated; means for storing the ABM at an application space of the application server; means for producing instructions for modelling one or more aspects of generating a client application, the instruction producing means providing an output (GMo) where the GMo corresponds with the at least one of the first device and the second devices to which the end user is associated; a repository including a first application template and a second application template, the first and second application templates corresponding respectively with the first and second devices, wherein the first application template is configured to accommodate for the functional capability set of the first device and the second application template is configured to accommodate for the functional capability set of the second device, wherein the GMo is used to select one of the first application template and the second application template; means for instantiating the selected one of the first and second application templates to produce program code, the program code corresponding with a client application; means for launching the program code of the client application at the at least one of first device and second device to which the end user is associated; and wherein the application execution engine and the at least one of the first device and the second device to which the end user is associated cooperatively use the ABM and the client application to execute the application.

DESCRIPTION OF THE DRAWINGS

The present disclosure will become more fully understood from the detailed description and the accompanying drawings, wherein.

Each of FIGS. 16A and 16B illustrate a schematic flow diagram corresponding with page rendering and navigation performed pursuant to application execution.

In the drawings, reference numbers may be reused to identify similar and/or identical elements.

DETAILED DESCRIPTION

A. System Architecture

Figure 1A:
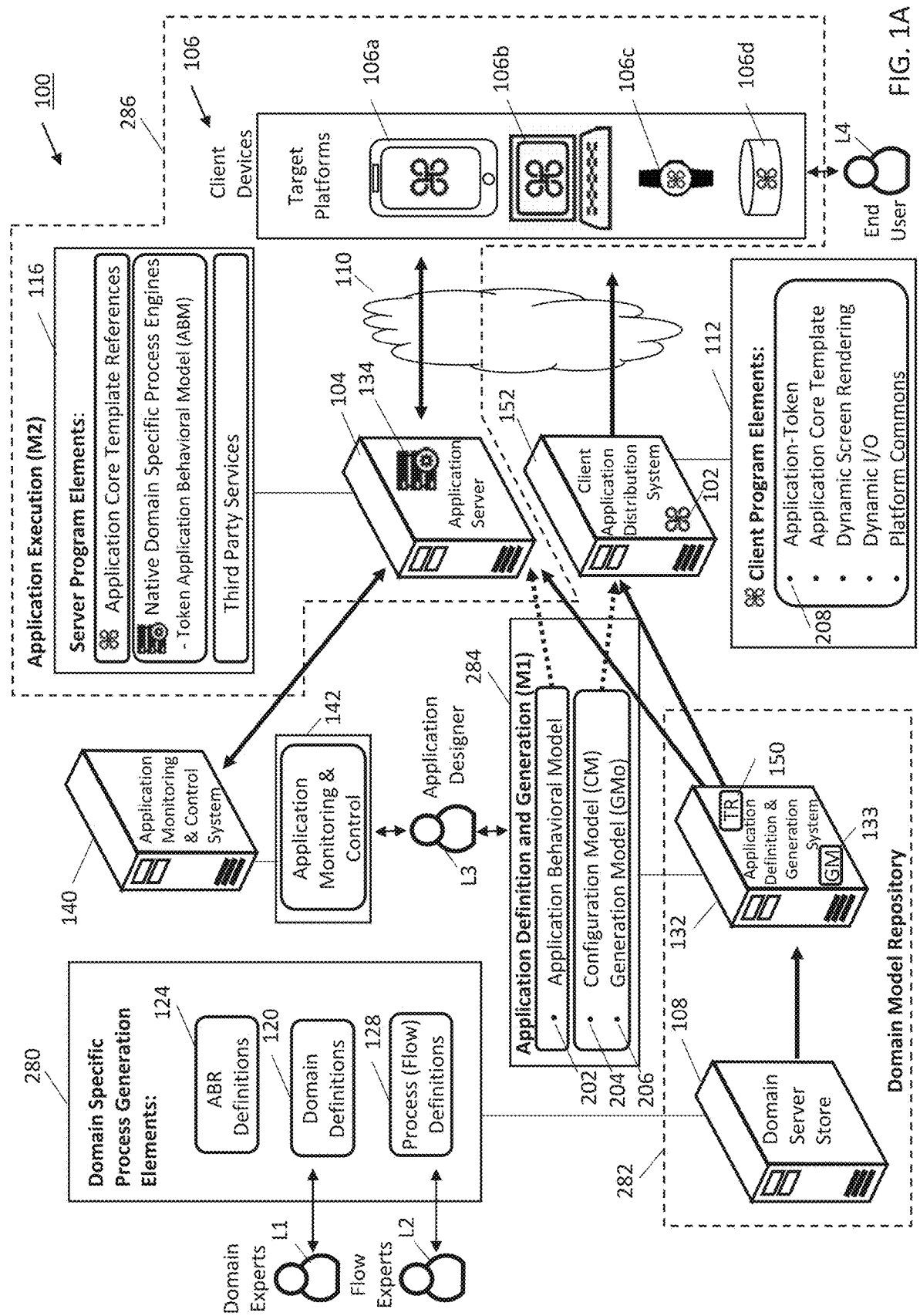
FIG. 1A is a schematic, diagrammatic view of a system for generating an application and cooperatively executing the application between an application server and one of a plurality of target client devices.
Figure 1B:
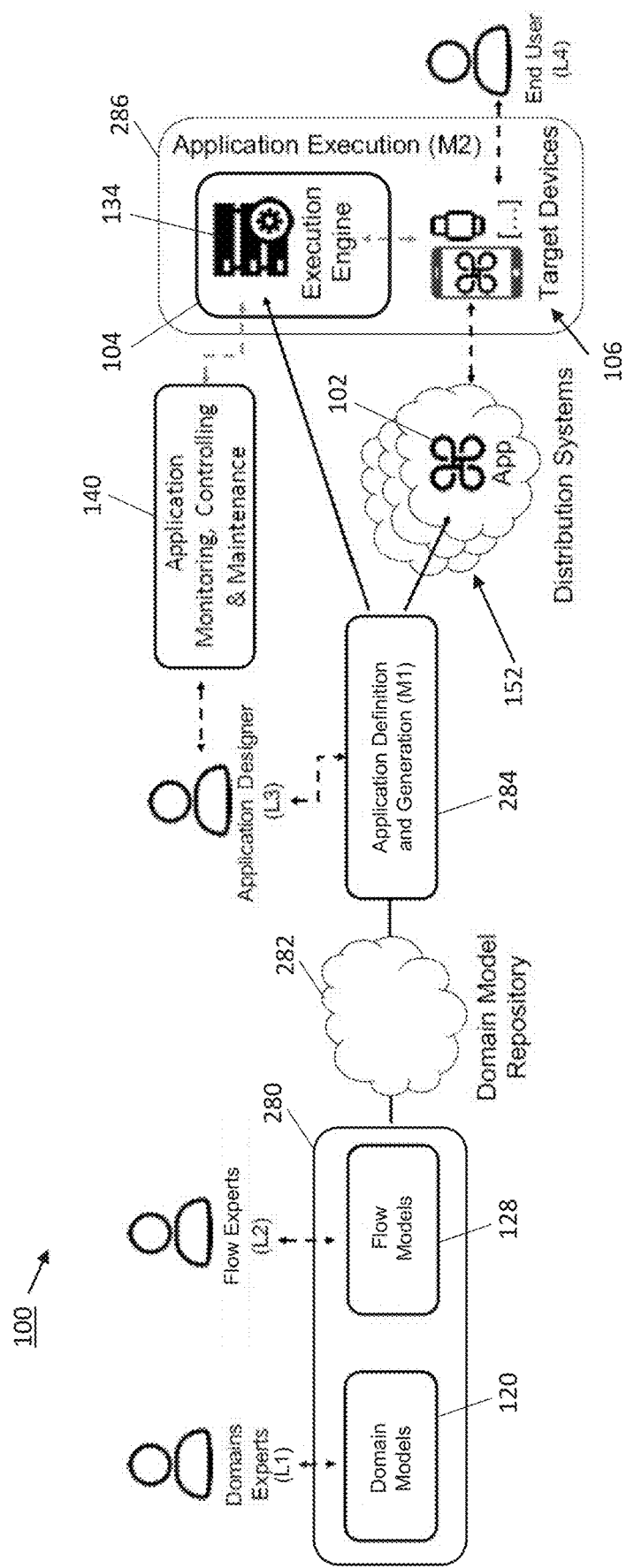
FIG. 1B is a schematic, diagrammatic, simplified view of FIG. 1A.

FIG. 1A, and FIG. 1B which sets out a simplified version of FIG. 1A, set forth a schematic, diagrammatic view of a system 100 for generating an application and cooperatively executing the application between an application server 104 and one of a plurality of target client devices 106, which includes domain specific process generation elements 280, a domain model repository 282, a system for generating applications (M1) 284 and a system for executing applications (M2) 286.

As will be described in detail below, the client application 102 is generated using domain models (i.e., domain definitions) 120 and flow models (i.e., process definitions) 128 available in a domain server store 108. The client application 102 is executed through cooperate interaction between the application server 104 and the one of the target client devices 106. As will be appreciated by those skilled in the art, the client devices 106 can include any contemplated device employing a suitable application platform. Moreover, the system 100 allows an application designer L3, who lacks the technical skills necessary, to generate applications for any one of the target client devices 106. Advantageously, each client application 102 is made up of client program elements 112 that can run natively on the variety of client devices 106 without requiring the application designer L3 to actually write any client programs, let alone any programs necessary for execution of a client application 102 on a client device 106.

Each client device 106 may be associated with one or more target platforms (e.g., a client device that is a mobile phone may run Android and iOS operating systems, with each having a specifically compiled client application). Generally, similar client devices 106 will have comparable functional capabilities (e.g., a target mobile device 106a and a target computer device 106b may allow a user to provide input using a virtual touch screen or a physical keyboard/keypad). However, there are also cases where client devices 106 have different input functional capabilities (e.g., unlike a target computer device 106b with a virtual or physical keyboard/keypad, a target console device 106d may only allow a user to provide input audibly through a microphone) and/or output functional capabilities (e.g., unlike a target computer device 106b with a screen, a target console device 106d may only provide output to a user audibly through a speaker or using haptic feedback, with vibration for example).

Advantageously, the application server 104 running server program 116 uses an adaptive mapping of application data from client devices 106 to manage each client device 106 independent of its functional capabilities. That is, client devices 106 do not require the same functionality to operate (i.e., may seamlessly interact using different functional capability sets) with application server 104. For example, the application server 104 is adapted to interact with client devices 106 having a touch screen in its functional capability set (e.g., a mobile device 106a, a computer 106b, and a watch 106c with touch screen input capabilities) or lacking a touch screen in its functional capability set (e.g., voice console 106d with voice command input capabilities and lacking touch screen input capabilities). In one example of operation, the application server 104 communicates with one or more of the client devices 106 by way of a network 110, which in one embodiment is cloud or mobile based so that communication with a given one of client devices 106 may be achieved with one of several conventional network-based approaches.

Figure 2:
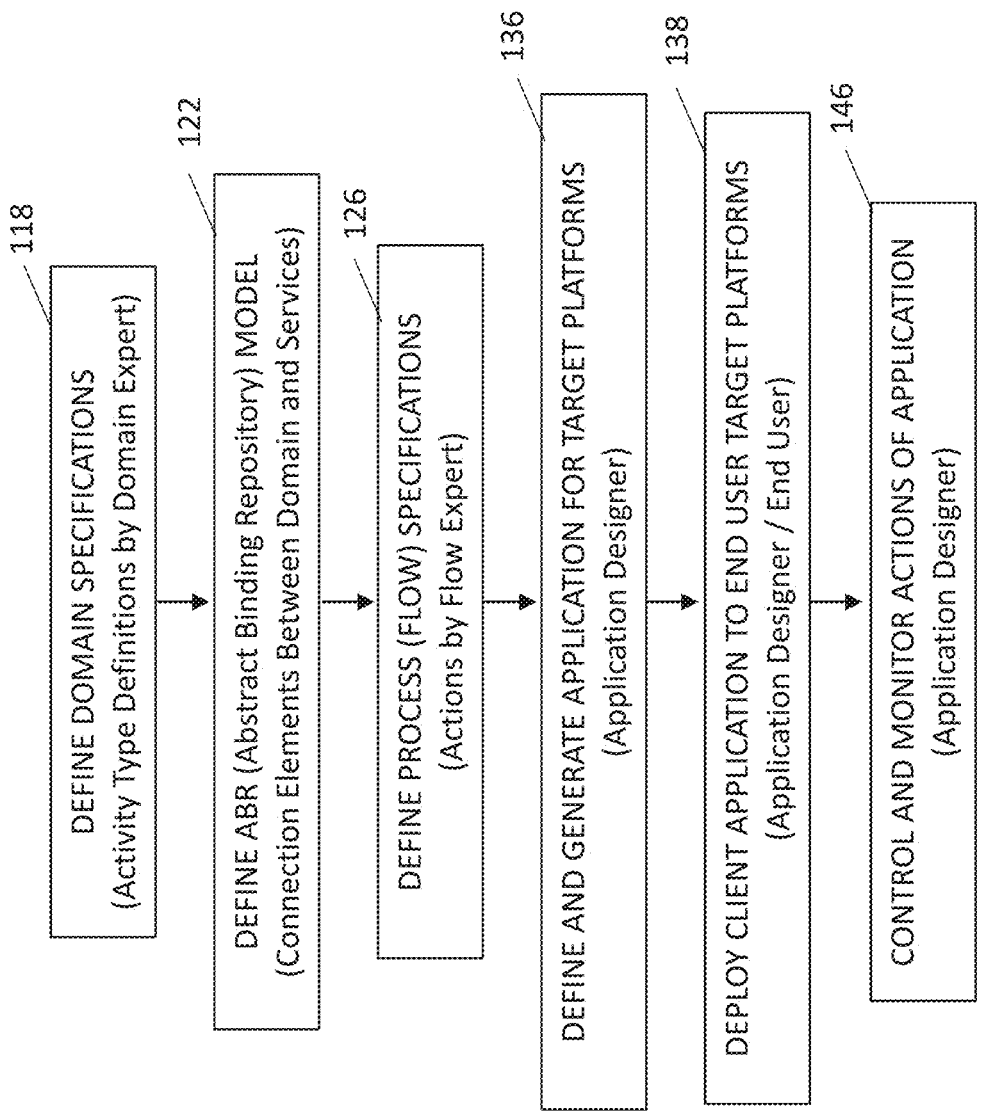
FIG. 2 is a flow diagram setting forth a method for generating and executing applications with the system of FIG. 1.

FIG. 2 is a flow diagram setting forth a method for generating and executing applications with the system 100 of FIG. 1.

Figure 6:
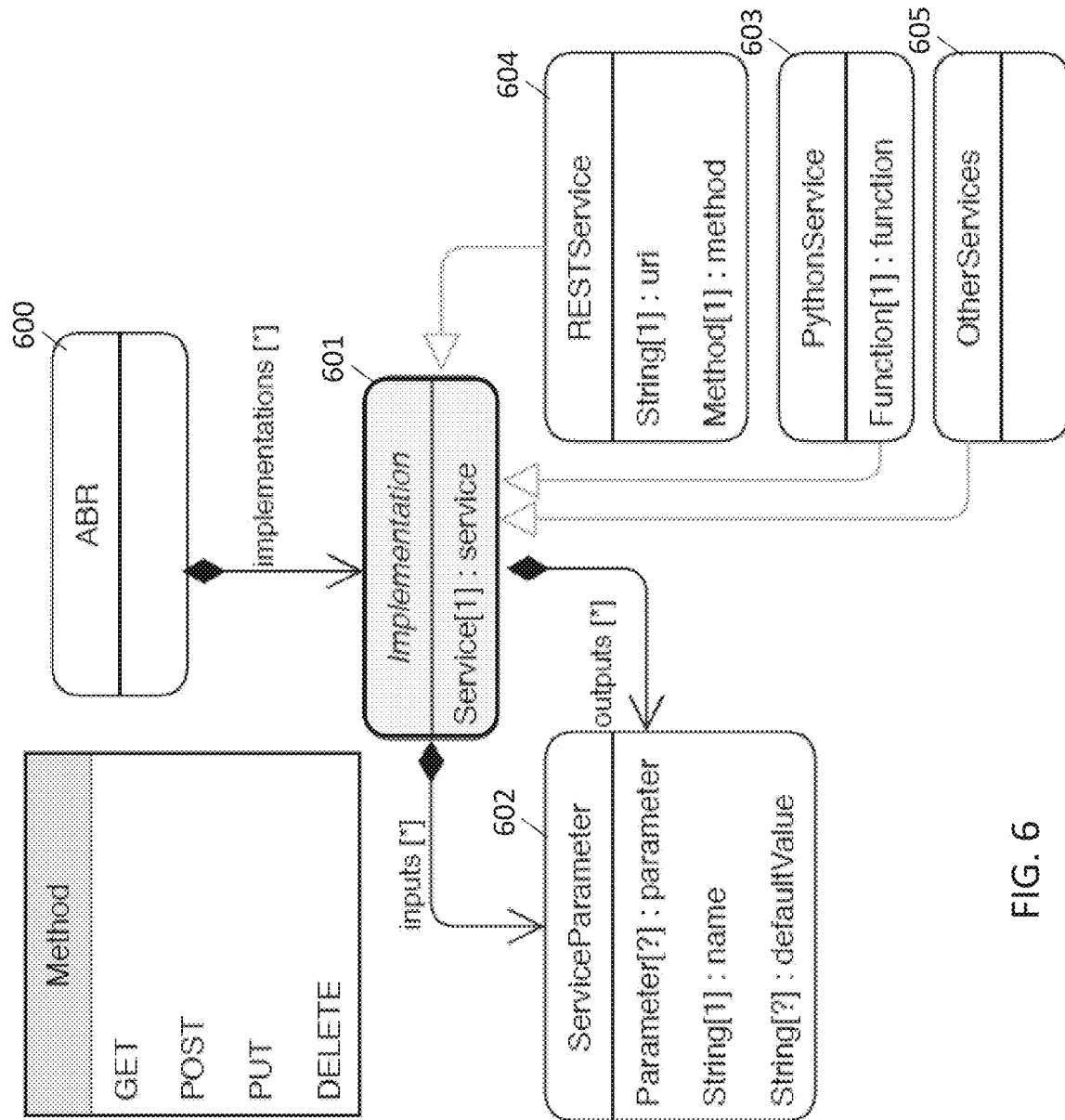
FIG. 6 is a schematic, diagrammatic view of a graphic meta model relating to process (flow) definitions.

At 118 in FIG. 2, domain specifications 120 (FIG. 1), including activity type definitions, are provided by a domain expert L1. Referring specifically to the graphic meta model of FIG. 4, the top-level element is Domain 401. As can be seen, it contains a set of Activity 402, Service 403, IO element 404 and Type 405 elements. A data Type 405 represents a kind of data structure. It is composed of a set of Attributes 405 that define the type. A Service 403 represents an entity that can be executed either by calling a function available in the system, or an external call. It is composed by a set of input and output Parameters 407 that represent the inputs and outputs of the service. Note that this is an abstract service, which is preferably connected to the concrete implementation through an abstract binding repository (ABR) model 600 (FIG. 6). An IO element 404 represents an input/output operation, i.e., information that must be retrieved from an external source (for instance information to be provided by a human) or information that must be exposed (for instance to be presented to a human). It is composed by a set of Variables 408 that contain the elements to be retrieved or exposed.

The IO element 404 does not specify whether the information to be retrieved must come from a human, or whether data to be exposed must be presented in a graphical user interface. The aim is to give freedom in the representation to the clients of the execution engine. For example, if the true location is requested, a mobile application could acquire it automatically from sensors of a client device, while a browser-based application could ask an end user to indicate it on a map.

Figure 4:
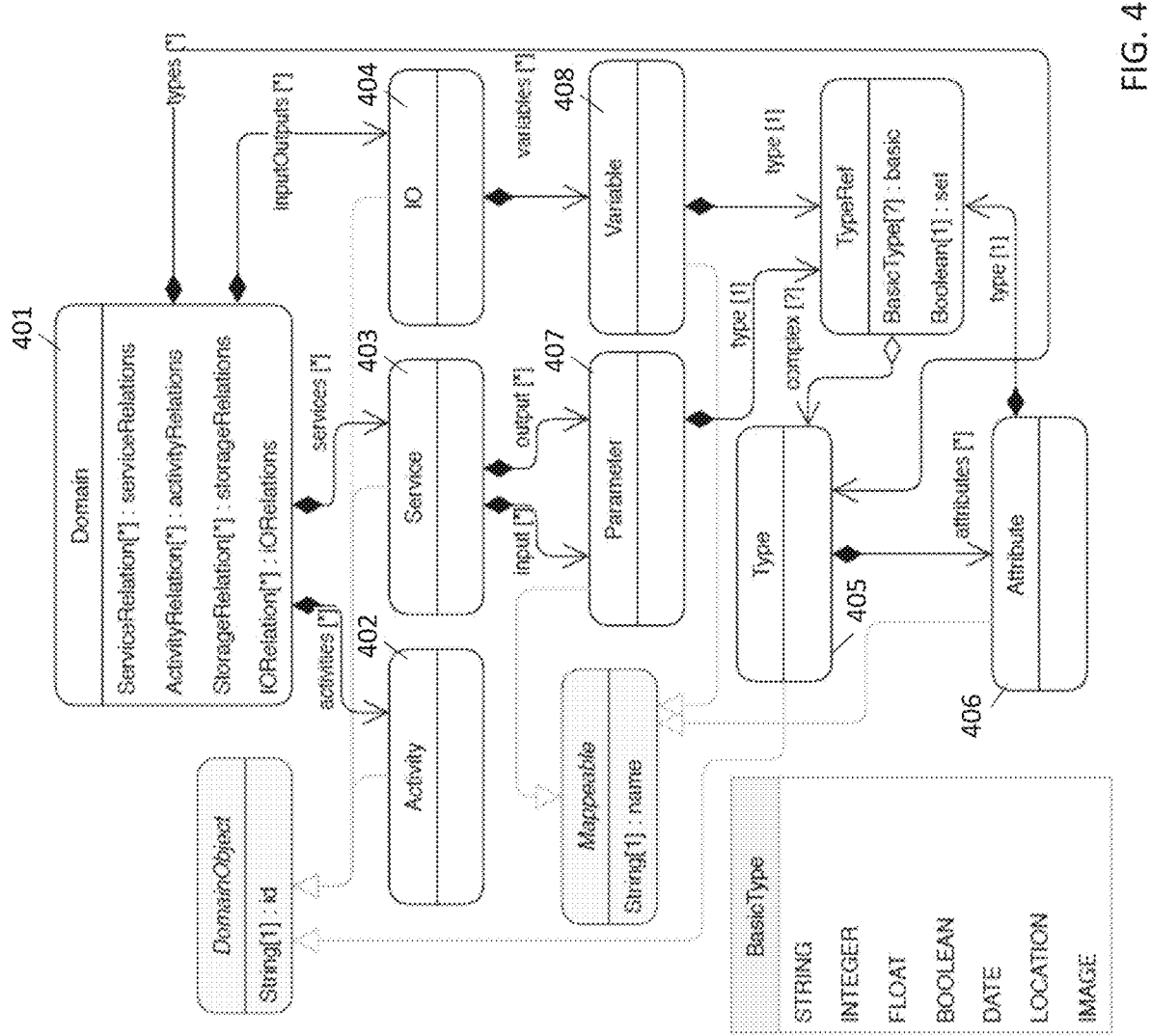
FIG. 4 is a schematic, diagrammatic view of a graphic meta model relating to ABR definitions.
Figure 5:
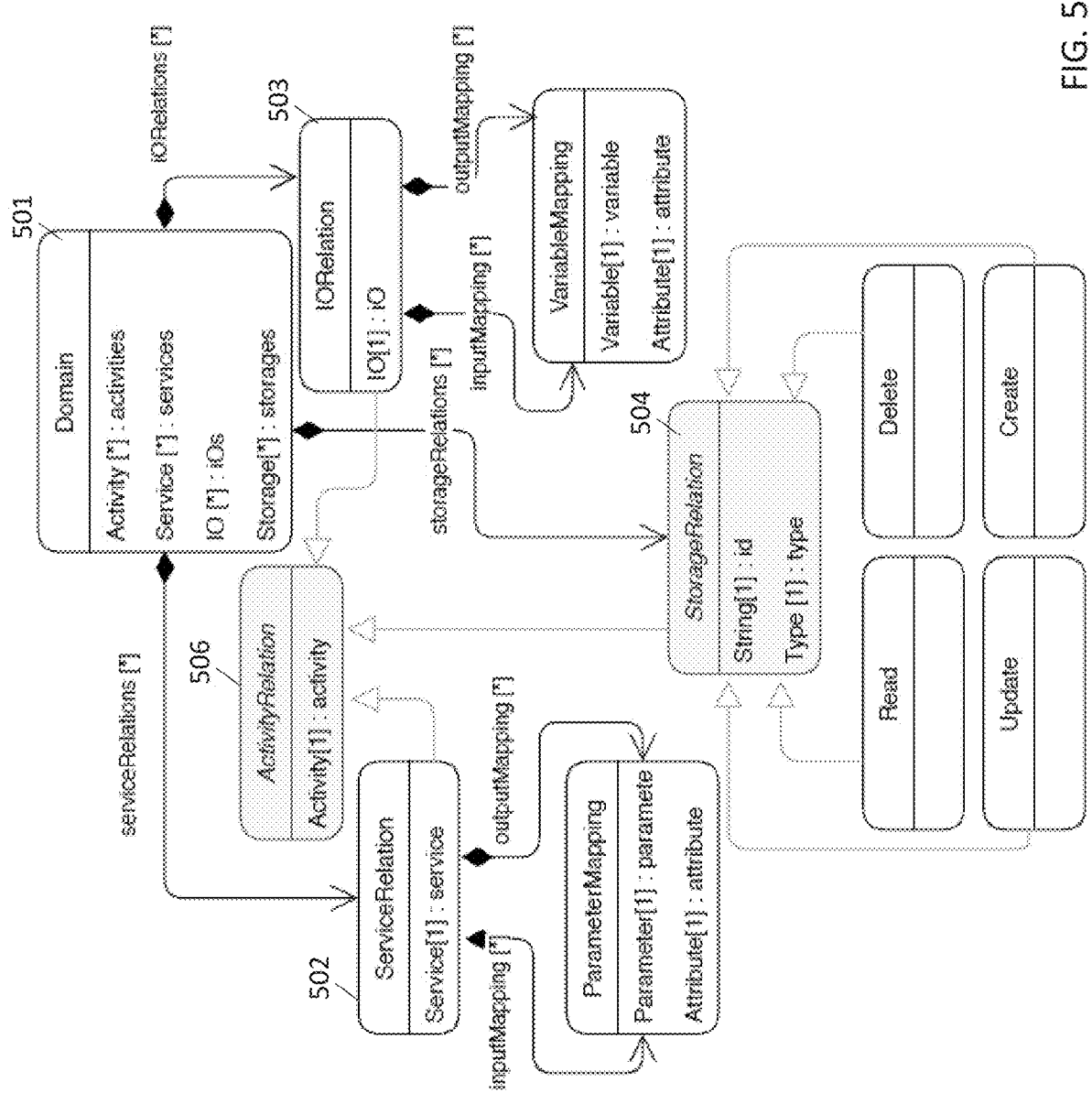
FIG. 5 is a schematic, diagrammatic view of a graphic meta model relating to domain definitions.

Additionally, an Activity 402 represents an atomic unit of basic behavior. As can be seen in FIG. 5, the domain 501 meta-model contains relations between Activities and the elements defined above, through a series of ServiceRelations 502, IORelations 504 and StorageRelations 504. A ServiceRelation 502 relates an Activity (it is a subtype of ActivityRelation 506) to a Service 403 (FIG. 4), and also defines a mapping between the input(s)/outputs parameters of the service and the attributes of a Type 405 (FIG. 4). At runtime there is a memory space where activities exchange information, called the data flow. The activities read values from the data flow and create or update values in it. These operations are specified in various tasks through the mappings. Input mappings define the variables from the data flow that will be used to call the Service 403, while output mappings define how the data flow is updated by using the values returned by the Service 403. In the same way, an IORelation 503 relates an Activity 402 to an IO element 404, and it also models the source of the information to publish from the data flow (outputMappings), as well as how the data flow is updated with the requested information (inputMappings).

Finally, database operations of the Activity 402 (FIG. 4) are modeled in a StorageRelation that defines the related CRUD (Create, Read, Update and Delete) operations. A read operation indicates that the data flow is updated with the information stored in the database. A create or update operation specifies that the object is created or updated in the database, while a delete operation indicates that this object is removed from the database.

At 122 in FIG. 2, abstract binding repository (ABR) definitions 124 (FIG. 1A), including connection elements between domain and services, are provided. Referring to FIG. 6, a graphic ABR meta model 600 is shown. The Services modeled in the domain 501 (FIG. 5) are abstract services, with no specific implementation details in the domain model. Those details are collected in an implementation meta class 601 (FIG. 6).

The implementation meta-class 601 (FIG. 6) is composed of implementation details as well as a set of ServiceParameters 602, as inputs and outputs. Each ServiceParameter element 602 models the name of the real variables of the service implementation, and maps them with the Parameters that have been modeled in the abstract representation of the Service in the domain model. The reason is that various type of services, ranging from a PythonService 603 that represents a script written in Python, to a RESTService 604 that represents the integration with a third-party system by using Representational State Transfer (REST), to any OtherServices 605, can be modeled. The ABR meta-model 600 is therefore prepared to be extended with new Implementation types 601.

Figure 7:
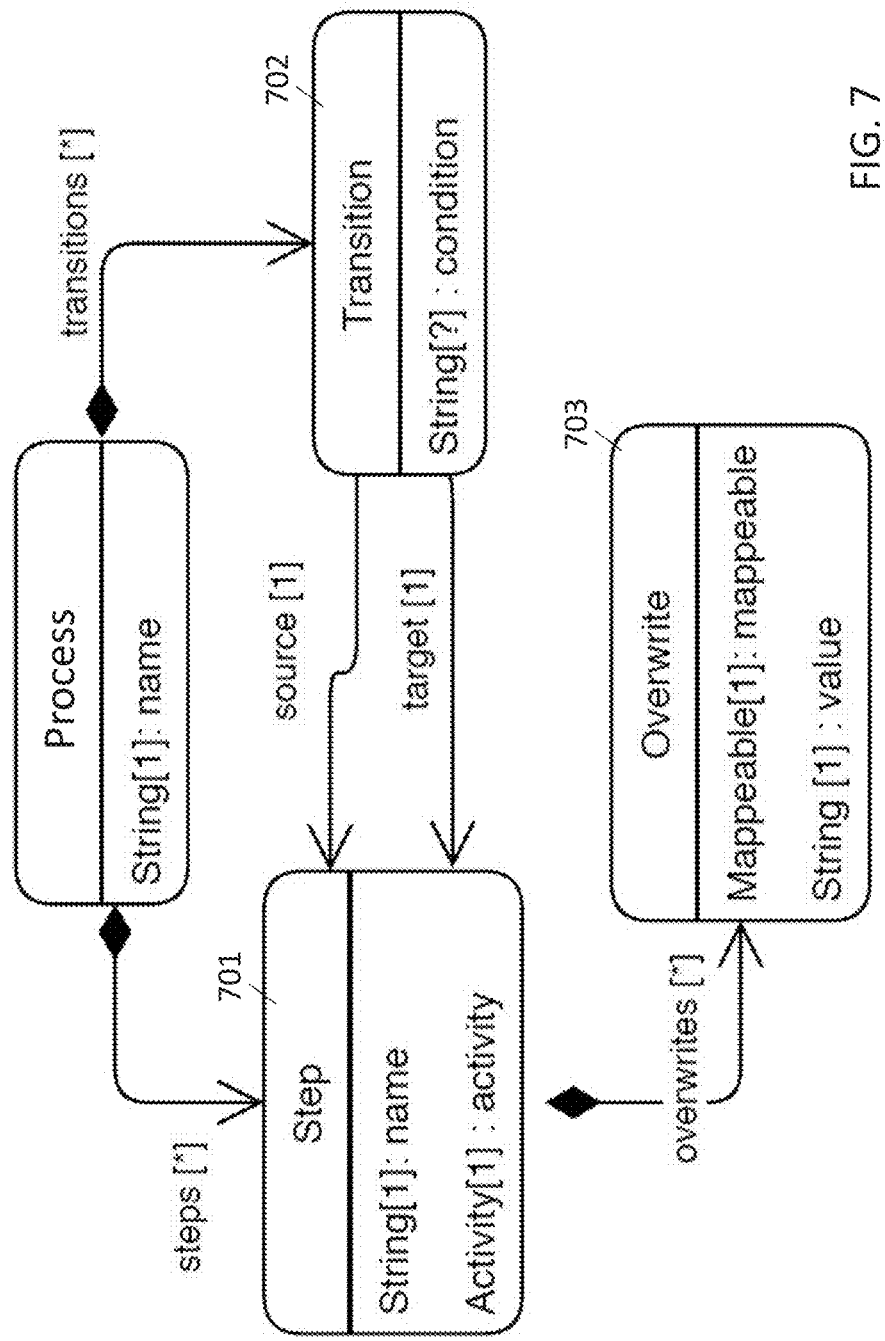
FIG. 7 is a schematic, diagrammatic view relating to graphic meta model relating to a flow.

At 126 in FIG. 2, flow specifications 128 (FIG. 1), including actions by a flow expert L2, are provided. A "flow" models a function of behavior by combining activities defined in a set of domains. FIG. 7 includes Steps 701 and associated Transitions 702 of a flow model. On one hand, a Step 701 is a utilization of a domain model (Activity). On the other hand, a Transition 702 establishes a relationship between source and target Steps 701. The transition can contain a condition, which is a boolean expression that indicates if the transition should be used or not.

A Transition 702 also establishes the flow of information between two Steps 701. This defines the data flow, which has the effect that the information generated in the source Step 701 will be available to be used in the target Step 701, and any subsequent steps as reachable through the transition graph 702.

The way the variables are managed in the data flow (created, updated, read or deleted) is defined in the Activity of the corresponding Step 701. However, it may be useful to permanently set the values of such variables at flow level during flow design. In this case they are considered constants for all flow instances. For example, a variable called "user-message" could be set to a certain value by the application designer who desires, at a certain stage during execution, that a given message be displayed. To this end a Step 701 can contains a set of Overwrite elements 703. An Overwrite 703 relates a parameter of a Service 403, a Variable 408 of an IO element 404 or an Attribute 406 of a Type 405 (all of them Mappable), with the value that will be injected regardless of other potential values available in the data flow.

A motivating example for the present disclosure is described in the Appendix attached to U.S. Provisional Patent Application Ser. No. 62/948,429, filed on Dec. 16, 2019 (hereinafter referred to as "the '429 Appendix"), which is hereby incorporated herein by reference involves the following scenario: a tourist office of a small town would like to create an application to promote several attractions and does so using the system 100. The application would allow tourists to submit reviews of monuments, accompanied by pictures if they are within a certain range of their location. In exchange for their input, the tourist receives reward points, provided that the review image matches the contents of the official picture of the given monument (using computer vision image matching functionalities).

Figure 8:
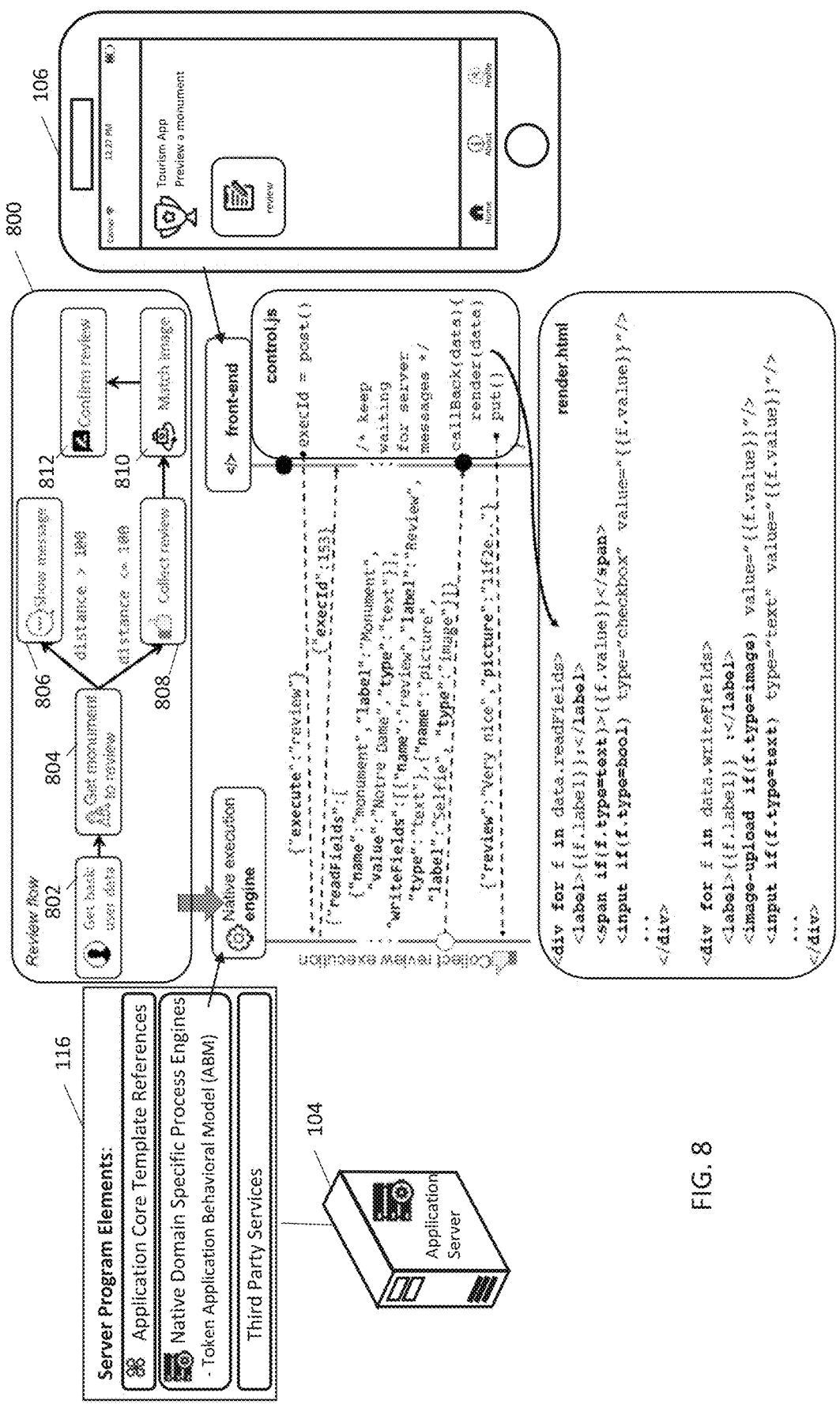
FIG. 8 is a schematic, diagrammatic view of an exemplary flow along with related code illustrating exemplary communication between an application execution engine and a client device.

In the motivating example of the '429 Appendix, a flow expert L2 uses a graphical environment for creating a flow model. FIG. 8 shows the resulting flow model 800 (or graphical representation) in a simplified form. As will be appreciated by those skilled in the art, other representations of this model are envisioned. Each rectangle in the flow 800 in FIG. 8 represents a Step 701 (FIG. 7) for the execution of a domain activity instance, while each arrow in the flow 800 models a Transition 702 (FIG. 7). Three domains have been used to define the flow 800, one of which, the tourism domain 850 is shown in FIG. 9.

Figure 9:
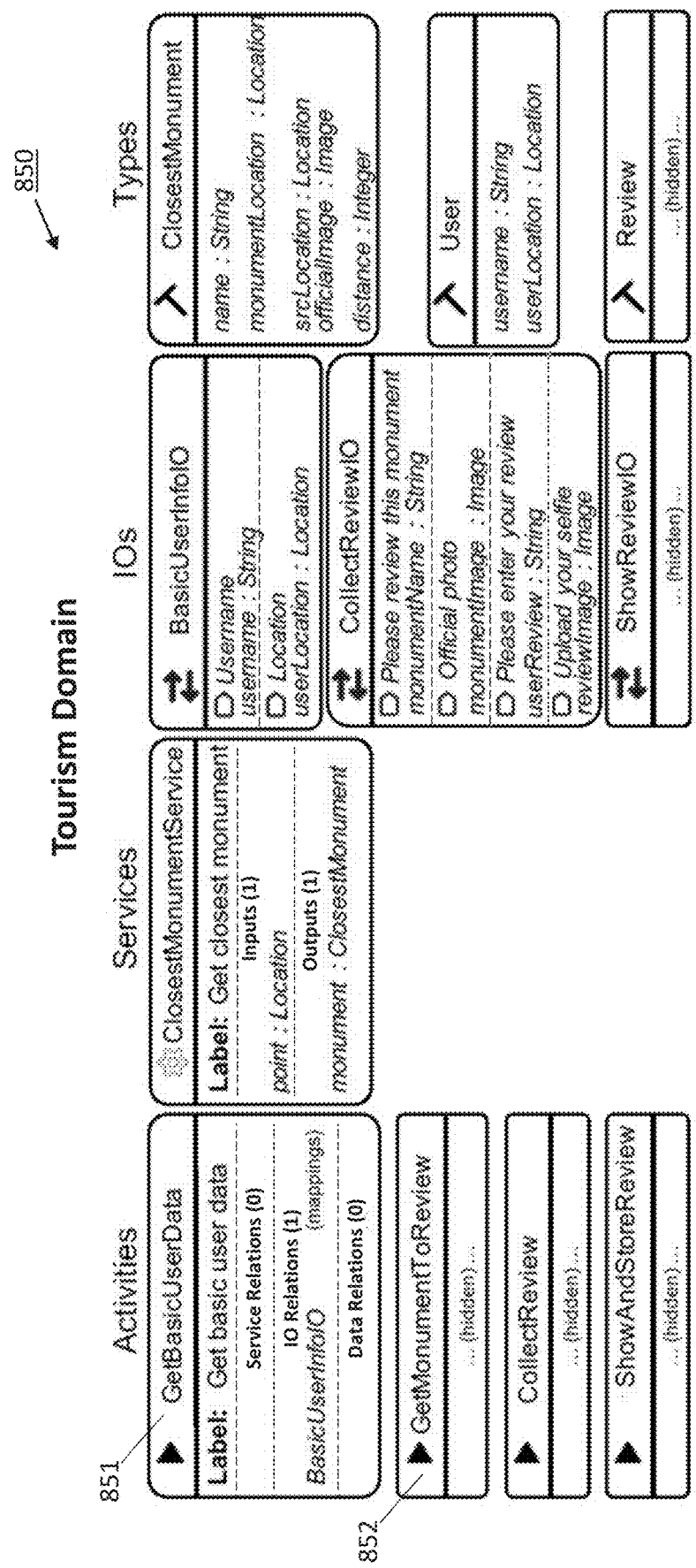
FIG. 9 sets out one of three domains used to define the exemplary flow shown in FIG. 8.

Step (701 in FIG. 7) in the flow model 800 (FIG. 8) is Get Basic User Data 802 that corresponds to the domain activity GetBasicUserData 851 of the domain 850 shown in FIG. 9 and its purpose is to retrieve a tourist name and location. After Step 802, the closest monument to the user location is identified at Step 804 bound to the domain activity GetMonumentToReview 852 (FIG. 9). In the event the distance to the monument is greater than 100 m (see the condition in the Transition 702 referred to above with reference to FIG. 7), the message "You're too far" will be displayed (note that the Step 806 Show message, which comes from the message domain, is setting the contents of variable msg). In case the distance to the monument is less than or equal to 100 m, the review is collected through execution of Step 808 Collect review. Lastly at Step 812, a summary is displayed to the end user and the review is stored after executing Steps 810 that verifies the contents of the official picture of the given monument being reviewed matches the tourist's picture accompanying the review.

Figure 10A:
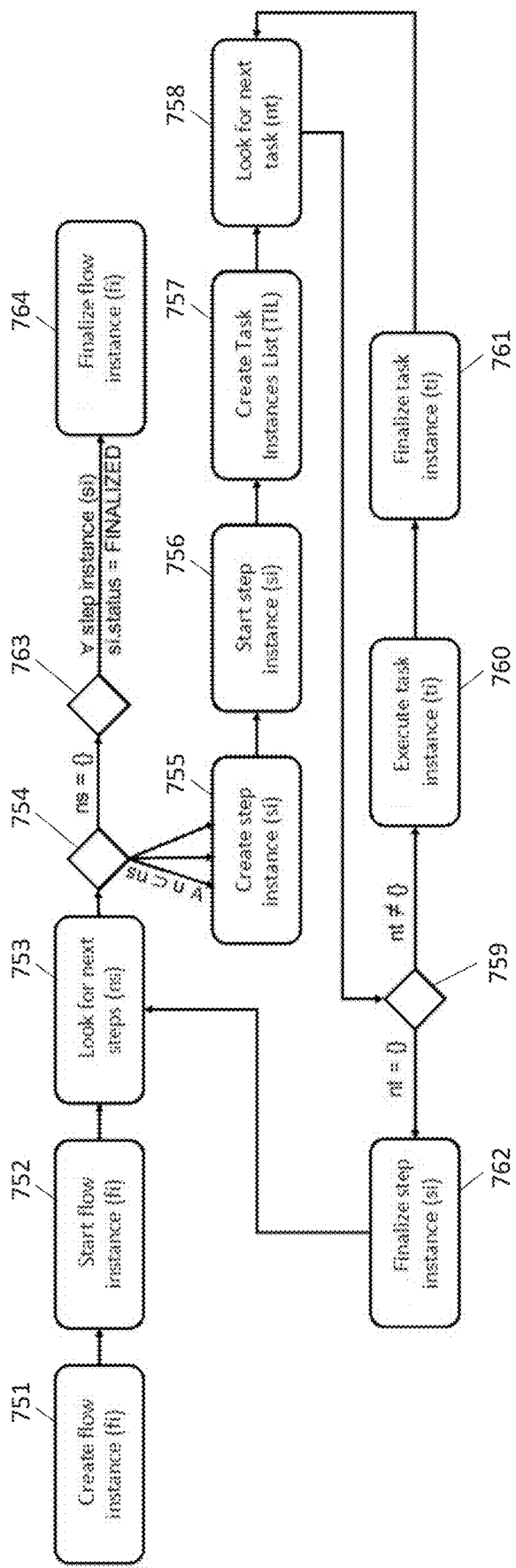
FIGS. 10A-10C set out a flow diagram illustrating flow execution overview for a motivating example.
Figure 10B:
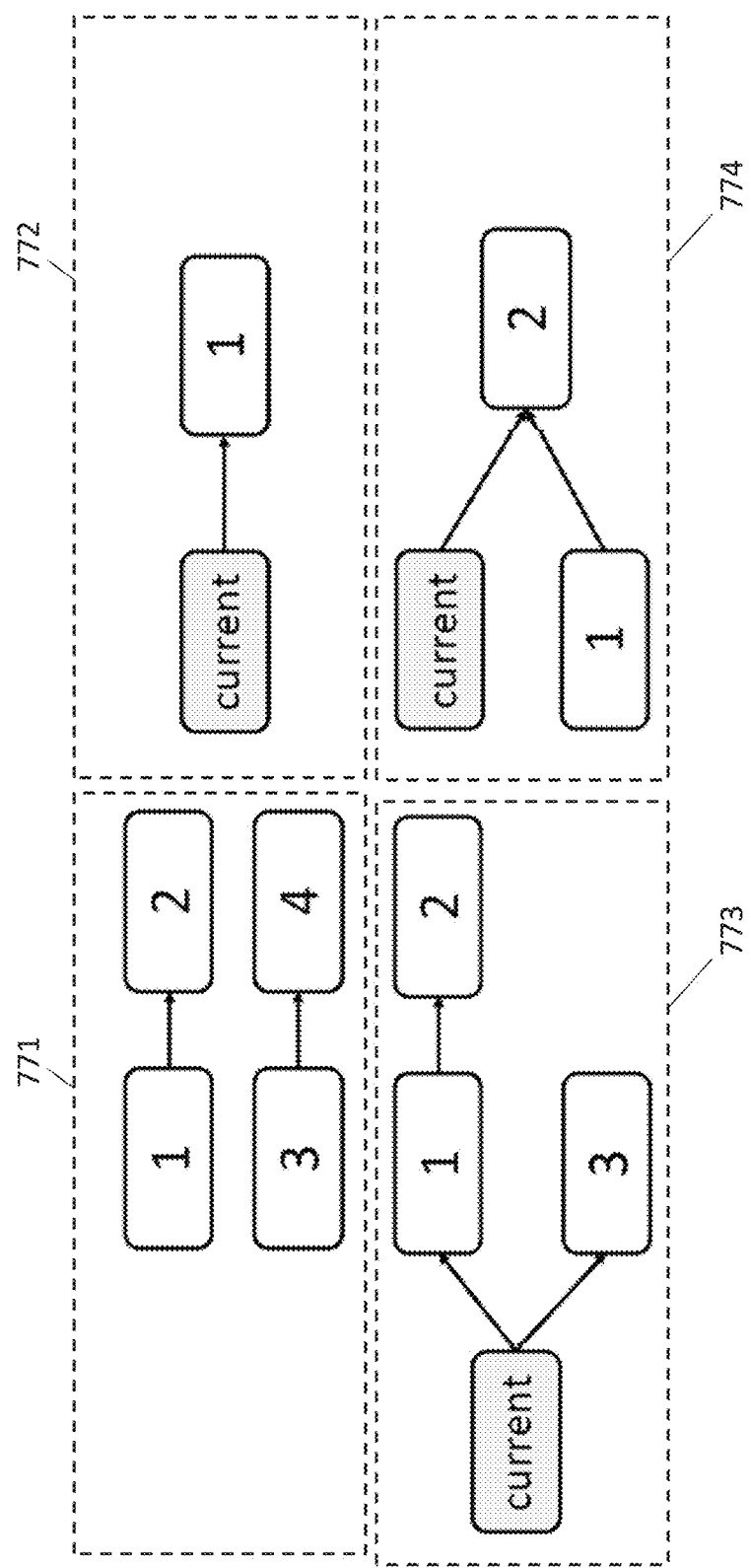
Figure 10C:
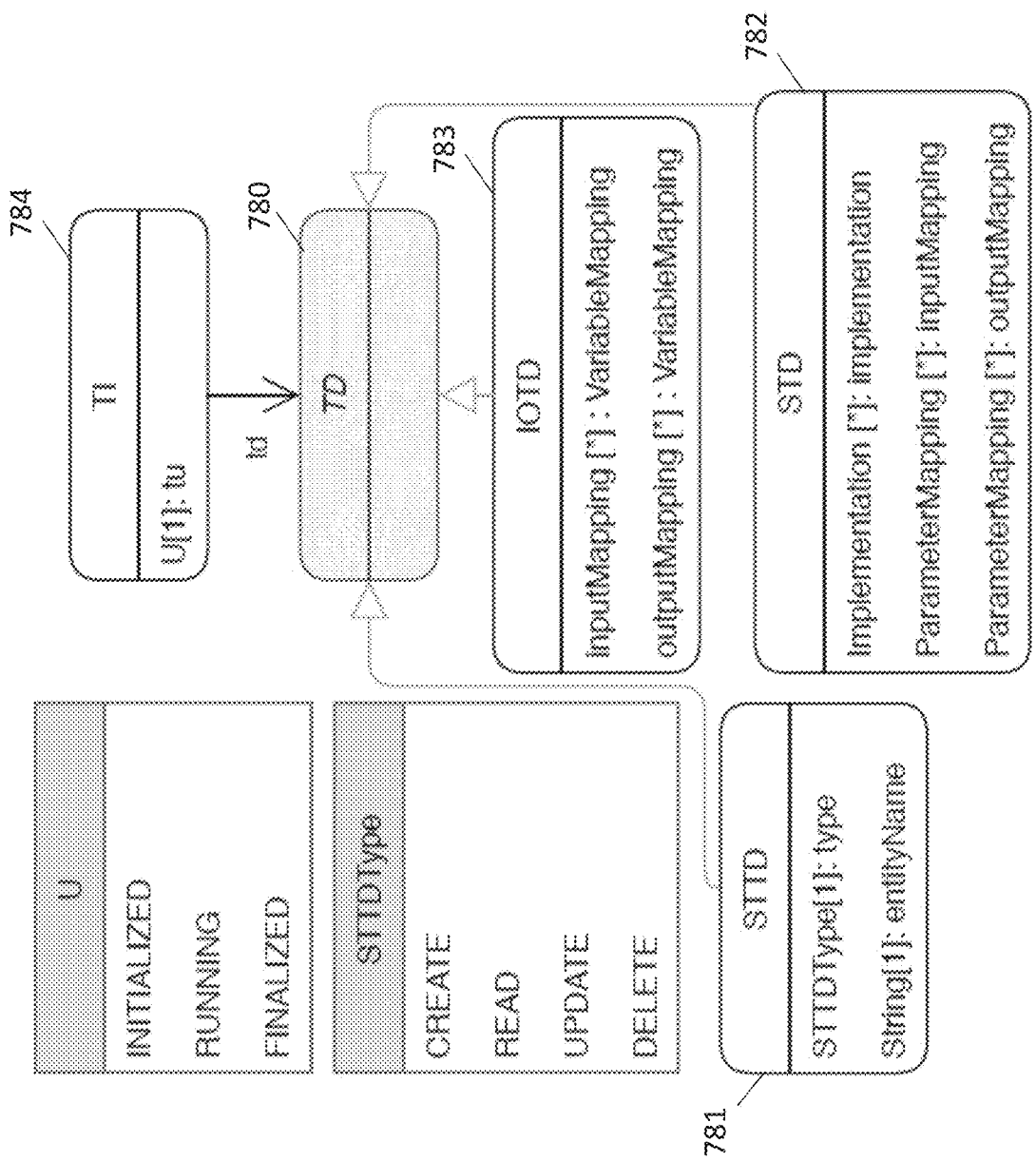

Referring to FIGS. 10A-10C, a mechanism used to execute flow models natively is shown. FIG. 10A provides an overview of an execution approach. FIG. 10B illustrates four examples for 753 in FIG. 10A. FIG. 10C graphically illustrates task types for 757 in FIG. 10A.

At 751 [create flow instance (fi)], a Flow Instance (FI), which relates to a space where information about the flow execution is kept up to date, is created. In this space information such as the evolving execution status may be found, as well as other data such as the end user that starts the execution, the start time and end time, and any other data useful when monitoring the flow instance execution.

While a large variety of data can be stored as part of the FI, this description focuses on the minimum needed for the described mechanism, which is: the identification of the flow FI, which corresponds to the status of the FI and a set of global variables. Therefore, it is possible to define FI=f, u, GV, where f represents the Flow in the Flow Model, s represents the status of the instance u∈U, U={INITIALIZED, RUNNING, FINALIZED}, and GV is a set of global variables, GV={(name, value)}. The FI is created with state INITIALIZED, therefore: $f_i=\langle$ flow, INITIALIZED, $\{\ \}\rangle$.

At 752 [start flow instance (fi)], a flow instance is started which consists of changing the status of fi to RUNNING. fi= $\langle$ flow, RUNNING, $\{\ \}\rangle$. This event marks when the execution of the flow starts.

At 753 [look for next steps (ns)], the flow is analysed in order to find the next step to execute. The next steps (NS) to execute will be the target step of any transition in which the current step is the source step, when the transition condition is either not present, or it evaluates to true.

Let a Flow F=⟨S, T⟩ where S={$s_1 \ldots s_n$} represents the set of steps, T={$t_1 \ldots t_m$} represents the set of transitions, and let T=⟨source, target, condition⟩, source∈S, target E S, condition an expression that can be evaluated to true or false which contains the condition to activate the transition. Let Eval(condition) be a function that evaluates a condition and returns true if the condition is fulfilled or is empty and false otherwise.

If cs ∈S is the current step, the set of next steps (NS) of cs is defined as NS={t.target} where (t∈T∧t.source=cs∧Eval(t.condition)=true).

On the other hand, in the case where the instance is starting its execution the cs=ø. Let H={t.target} where t∈T be the set of steps that are targets of any transition, NS is defined as NS=S−H and in the initial stage it would contain all the starting steps of the flow (parallelism is supported).

FIG. 10B illustrates the definition described at 753 with four examples. In the first example at 771, there is no previous step, so the next steps (initial steps in this case) will be 1 and 3, since these are the steps that are not the targets of any transition. In the second example at 772, the next step will be 1, since there is a transition between the current step and the step number 1. In the third example at 773, the next steps will be 1 and 3, since there are transitions between the current step (common source of the transitions) and the steps number 1 and 3 (that are targets of the 2 outgoing transitions). In the fourth example at 774, the next step will be number 2.

At 754, if there are no steps to execute, there is nothing else to do and the execution finishes (refer to 763), however if NS=ø, the execution continues (refer to 755) for each s∈NS. The mechanism proposes two execution modes: create parallel executions for each s∈NS or maintain them in a stack to be executed sequentially. This choice is subject to application needs and can be configured externally.

At 755 [create step instance (si)], the step under execution is set as cs (current step). The Step Instance (SI) of cs is defined as SI=⟨s, fi, uis, TIL, SV⟩ where s is the referenced step definition s∈S, fi is a reference to the flow instance, uis∈U represents the status of the step instance, TIL={TI} is the ordered list of task instances, and SV is a set of step variables SV={⟨name, value⟩}. These elements of the SI are mandatory for the mechanism, but as exposed at 751, the instance can contain additional elements for execution monitoring purposes. Once the SI is created, it is initialized to SI=⟨step, flow, INITIALIZED, { }, { }⟩.

At 756 [start step instance (si)], the status of si is changed to RUNNING. SI=⟨step, flow, RUNNING, { }, { }⟩ to indicate the start of actual execution of the step.

At 757 [create Task Instances List (TIL)], the domain definition is analyzed and the ordered list of TI waiting to be executed is created on the fly. While creating the TIL={TI}, the mechanism also gathers all the required details necessary for the actual execution of the tasks. The task types can be seen graphically in FIG. 100. TI=⟨TD, tu⟩ where TD ⊂ STTD|STD|IOTD. As shown in FIG. 100, TD at 780 represents Task Definition, STTD at 781 represents a STorage Task Definition, STD at 782 represents a Service Task Definition, IOTD at 783 represents an 10 Task Definition, and TI at 784 represents Task Instances. The task status is also part of task instance information, with tu∈U.

The creation of TIL consists of:
a) Include a ti=⟨STTD, INITIALIZED⟩ ∀sr∈StorageRelation where sr.activity=cs∧typeOf(sr)=Read.
   STTD=⟨typeOf(sr), sr.entity.name⟩
b) Include a ti=⟨IOTD, INITIALIZED⟩ ∀ior∈IORelation where ior.activity=CS
   |ior.inputMappings|≥1, corresponding to information requested from the end user. IOTD=⟨ior.inputMappings,ior.outputMappings⟩
c) Include a ti=⟨STD, INITIALIZED⟩ ∀sr∈ServiceRelation where sr.activity=CS
   The ABR model contains the details about the execution of the services.
   This information is specified in an Implementation, imp=∀impls∈ABR.implementation where impls.service=cs
   STD=⟨imp, sr.inputMapping, sr.outputMapping⟩
d) Include a ti=⟨IOTD, INITIALIZED⟩ for all IORelations of the current step with something to show to the end user. ∀ior∈IORelation where ior.activity=cs∧|ior.outputMappings|>1∧ior.input Mappings=0.
   IOTD=⟨ior.inputMappings,ior.outputMappings⟩
e) Include a ti=⟨STTD, INITIALIZED⟩ for all StorageRelations with data to create, update or delete. sr StorageRelation where sr.activity=cs typeOf(sr)=Read.
   STTD=⟨typeOf(sr), sr.entity.name⟩

At 758 [look for next task (nt)], the first tasks of TIL with status INITIALIZED is retrieved. WTIL={$wtil_1 \ldots wtil_n$} where wtil∈TIL∧wtil.tu=INITIALIZED, nt=$wtil_1$. The execution of these tasks is always sequential.

At 759, if there is no next task to execute for the current step (cs), then there is nothing further to do for this stage except go to 762, if there is a next task, set it as current and go to 760. This is done for all tasks in TIL.

At 760 [execute task instance (ti)], next task (nt) is now called task instance (ti) ti=nt, and the status changes to RUNNING, ct.tu=RUNNING. If it is an automatic task typeOf(ct.td)=STTD typeOf(ct.td)=STD, the task is executed, if it is an I/O task typeOf (ct.td)=IOTD, the mechanism requests/sends the needed data from/to out-side. The execution will keep waiting until an external event indicates any required data is available. The means of data collection or (if it is the case) display from/to the client-side is the responsibility of the external application that calls the mechanism. For instance, in the motivating scenario described above with reference to the '429 Appendix, if the client of the engine implemented with the disclosed specification is a mobile web application, the information can be displayed to the end-user in a screen, and some of the needed data can be collected by using the available sensors, such as the camera or the GPS. The execution of the task at 760 can involve reading or updating variables referred to by the current step instance (cs) or flow instance (fi).

At 761 [finalize task instance (ti)], the status of the current task instance (ct) is set to FINALIZED ti.tu=FINALIZED.

At 762 [finalize step instance (si)], the status of the current step instance (cs) is set to FINALIZED cs.uis=FINALIZED.

At 763, if all the steps instances are finalized SR=∀$_{si}$∈SI, si.uis=RUNNING, SR=Ø, go to 764.

At 764 [finalize flow instance (fi)], flow instance FI is finalized: fi.u=FINALIZED.

Figure 11:
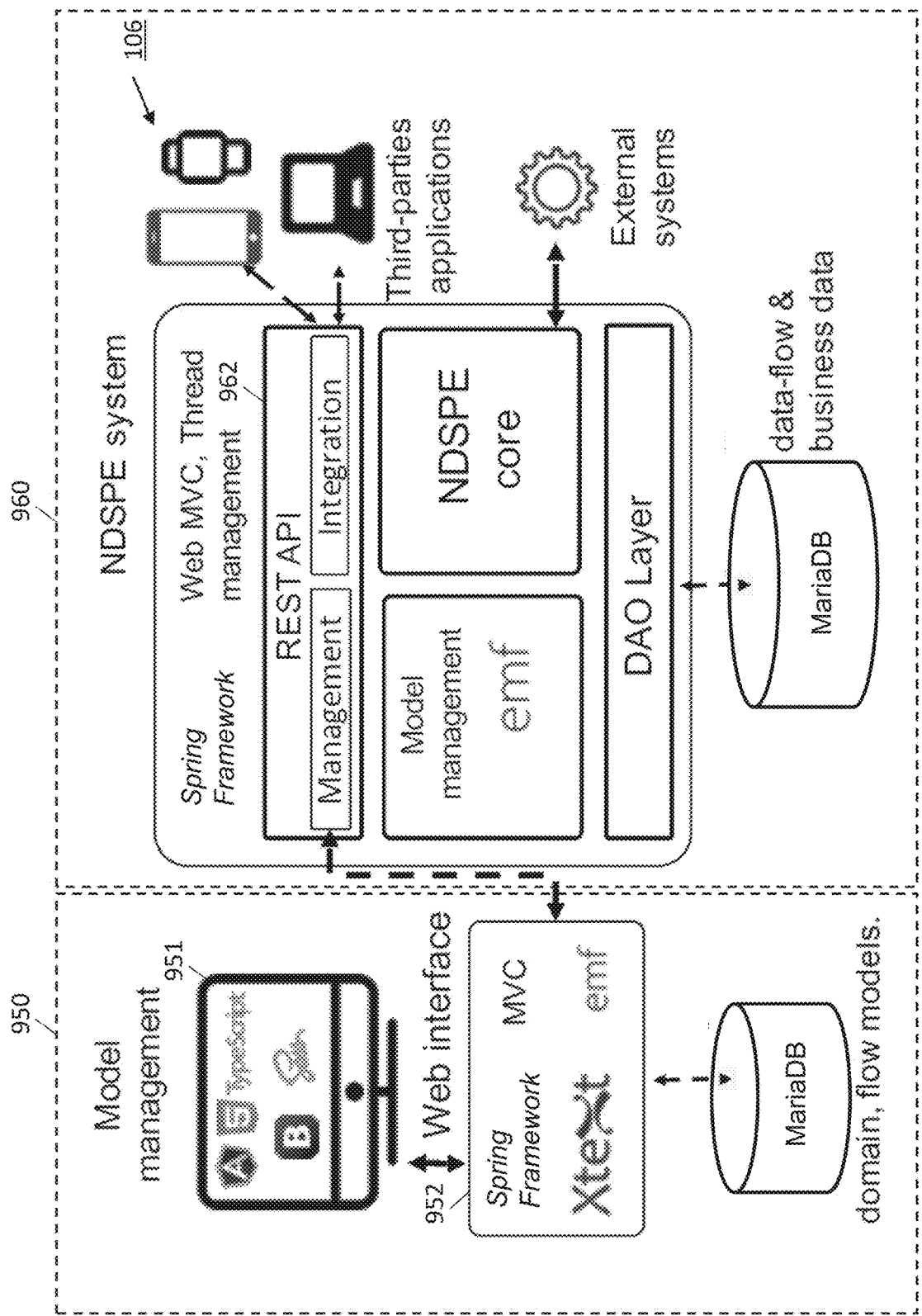
FIG. 11 is schematic, diagrammatic view of two exemplary systems for implementing the flow diagram set out in FIGS. 10A-10C.

Referring now to FIG. 11, to demonstrate the approach of the '429 Appendix, two systems were developed. On one hand, a Native Domain-Specific Process Engine (NDSPE) 960, implementing the mechanism of the '429 Appendix and including a set of interfaces that allow integration with third parties was developed. On the other hand, the NDSPE, as disclosed, employs domain and process models as input and, for this reason, a model management system 950 that facilitates the management of such models was also developed. FIG. 11 illustrates the two systems, as well as how they interact, and the technology stack used to develop them. Note that the respective sources of the proprietary components mentioned below, with respect to the description of FIG. 11, are more fully described in the '429 Appendix. Also note, the technologies appearing in FIG. 11 are exemplary in nature and it is understood that a variety of other technologies could be used to implement the system of FIG. 11.

In FIG. 11, elements 950 represent an example model management system. As can be seen it is composed of a portal front-end 951 and a back-end 952. The portal front-end 951, which is developed as a web interface that uses the state-of-the-art technologies for web interfaces such as HTML5, Angular 7, TypeScript, Twitter Boostrap, or Sass. The back-end 952, which uses the model-view-controller pattern is developed with the help of the Spring Framework because it facilitates the development of Java Enterprise applications, but also because it provides components for many purposes such as inversion controller container, web request management, as well as security or data access. To manage the models, Eclipse Modeling Framework (EMF) and Xtext were employed. These frameworks facilitate model-level operations (such as instantiation, relationship exploration, validation). Finally, the different domain and process models, as well as other items such as user information, are stored in a MariaDB database.

Further in FIG. 11, the elements 960 represent an example NDSPE system. The architecture of the system is also model-driven and does not contain a web-interface as it provides just the NDSPE functionalities, and two REST interfaces with several operations. The domain specification, the ABR, as well as the domain specific processes to be interpreted are managed by using EMF. MariaDB is used to store information relative to the instances (domain, ABR or process instances), data flow, as well as the application data. One of the reasons to use Spring Framework for this system is to create a configurable environment for using Java threads. Thanks to this environment the application engine is executed asynchronously, thus increasing the performance of the domain-specific process execution.

The other main aim of using the Spring Framework is to create a model-view-controller environment, in which the view is implemented in form of two REST Application Programming Interfaces (APIs) 962. One of them is to communicate with the system that provides the domain specific process models to be interpreted (Management REST API) which allows the deployment of domain-specific processes as well as accessing monitoring information. The other is to allow third parties to interact with the process execution (Integration REST API) which allows the management of the engine, by performing actions such as process execution, providing or receiving data, and by requesting information about the status of the execution of various elements.

Referring again to FIG. 1, the domain definitions 120, along with the flow definitions 128, are available on the domain server store 108. The definitions 120 and 128 are intended for use by the application designer L3 to model the behavior of the actions that can be performed in a given client application, where the client application is generated with the application definition and generation system 132. As can be appreciated by those skilled in the art, modelling a domain is a task that requires a strong understanding of technology and is therefore the responsibility of a technical domain expert L1.

While the flow in a domain is a much less technical task than defining a domain, it is still quite abstract and is therefore reserved to skilled people, namely a flow expert L2. An embodiment for defining domain and flow models is disclosed in US Patent Application Publication 20180039921 (U.S. application Ser. No. 15/228,493), the entire disclosure of which is incorporated herein by reference. As follows from the '429 Appendix, a flow may be implemented as a computer process, i.e. a set of specific code instructions for carrying out the corresponding action.

Referring again to FIG. 1A, the domains and flows are published in the domain server store 108 which contains all the possible behaviors that the application designer L3 can use to define the client application. Defining the client application using this data is a procedure that does not require technical skills as it involves simple configuration tasks such as setting the application name and logo, adding buttons to screens and setting some data elements. In order to define the behavior of an application, an application designer L3 selects one or several domains from the store 108, searches for relevant flows, and binds suitable buttons to the actions defined in the flows.

As described in further detail below with reference to FIG. 1 and FIG. 2, the application is defined and generated at 136 (in FIG. 2) by an application designer L3, and then deployed at 138 (in FIG. 2) for subsequent use by the end user L4. As can be seen in FIG. 1, execution of the application employs the support of an application execution engine 134 running on the application server 104. The application server 104 communicates with and application monitoring & control system 140, the system 140 including or communicating with an application monitoring & control user interface 142. Use of the system 140 brings a set of advantages that are discussed later, but one of these advantages is the degree of control and monitoring of the actions of end users at 146 (in FIG. 2) that is possible to attain.

As indicated at 136 and 138 in FIG. 2, M1 allows non-technical people, such as the application designer L3, to specify, configure and generate fully functional native applications for any one of target platforms of client devices 106. As illustrated in FIG. 1, client applications generated by using system 284 (of system M1) leverage the application engine 134 (of system M2) to execute the application. This brings about a set of advantages that follow from the description below.

B. Application Definition and Generation (M1)

Figure 3:
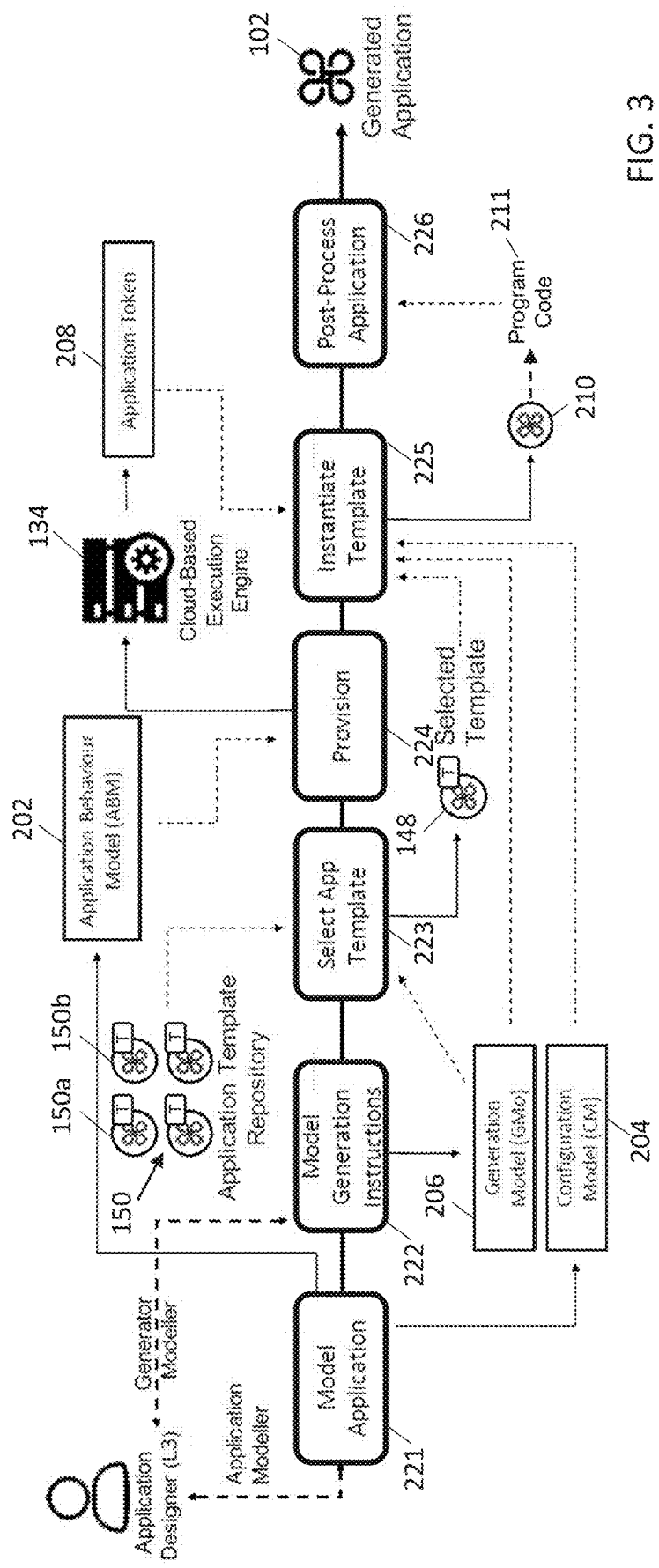
FIG. 3 is a schematic, diagrammatic view of a subsystem for generating the client application.

Referring to FIG. 3, an exemplary six step approach for modeling and generating a client application with system M1 is described.

At 221, the application designer L3 uses a graphical editor (or other suitable subsystem) to model an application by selecting a domain and at least one flow, with each flow being implemented as processes. Based on the domain and the flow(s) chosen by the application designer L3, the processing unit generates an application behavior model (ABM) 202.

The ABM comprises data representing associations between events and processes. Throughout the present description, the term "process" and the term "flow" are used interchangeably. The processes referenced in the ABM are stored in a process repository accessible to the application server 104 (FIG. 1A), or other memory of the application server 104.

Any association in the ABM between an event and a process represents that the process is to be executed whenever the associated event occurs during the execution of the application. Referring to an example in FIG. 12, the events referenced in the ABM are user inputs provided by way of a user interface of one of the client devices 106. These may include a user action on a graphical element displayed on a screen 107 of mobile device 106a or a vocal command captured by a microphone 109 of voice console 106d.

Furthermore, the ABM comprises data representing associations between events and output elements rendered at the client devices 106. An output element may include, for instance, a graphical element to be rendered on a screen 107 of client device 106a, such as a target page, or an audio element to be output by a speaker 111 on client device 106d, such as an audio recording.

Each association in the ABM represents that an output element is to be rendered whenever the associated event occurs during the execution of the application. Indeed, any association between an event and an output element to be rendered implicitly refers to a particular rendering process programmed to render such output element (graphical rendering or audio rendering). However, as contemplated, the ABM does not include the code for performing such rendering. This advantageously makes the ABM entirely independent of the platform type.

A non-limiting embodiment in which the ABM associates events with target pages is described below. Although processes (corresponding with flows) are referenced in the ABM, it is to be noted that the ABM does not itself contain any code instructions corresponding with such processes. In practice, the ABM contains event identifiers, processes identifiers and output elements identifiers. These identifiers may be associated in the ABM by means of a table, a map, etc.

The ABM further comprises page definitions (i.e., events, output elements, static information, or order and position of output elements contained in the page). One key point of the approach disclosed herein is the fact that the ABM is platform-agnostic, i.e., it does not include details of the client device, and is therefore the same for all the incarnations of the same application, independently of whether they are generated for iOS, Android or indeed other targets such as voice-based platforms. Another key point is that the ABM is not deployed as part of the application, instead it will be received and interpreted each time the application runs. As will appear, the ABM is instrumental in the execution of the application.

Figure 13:
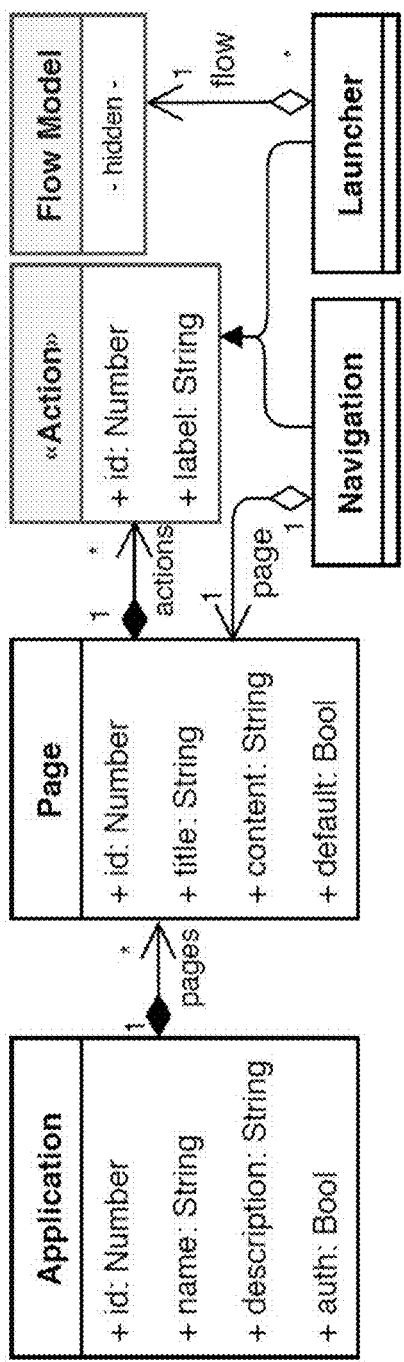
FIG. 13 is a schematic, diagrammatic view of a graphic meta model relating to an abstract behavioral model (ABM)

Referring to FIG. 13, a meta-model relating to the ABM is shown. The root meta-class is Application, which contains a unique id for the target application, its name, a description, and a set of pages. A Page is an aggregation of static information to display to the end-user (title and content), as well as the set of actions that is provides. Lastly, it contains a flag that indicates if the page is the default page, and therefore must be the first shown to the end user. An Action contains an id and a label, however, since it's an abstract meta-class, only its specialized meta-classes Navigation and Launcher is used. A Navigation action models a link to another page, while a Launcher action models the execution of a flow, and therefore contains a reference to a Flow Model.

As shown in FIG. 1A, an ABM 202 is deployed in the application server 104. The deployment of the ABM comprises allocating a space in a memory of the application server 104. This space is dedicated to the management of the needed datastores, flows and services that the application will need for execution, as well as for storing the ABM.

With reference again to FIG. 3, in addition to creating the ABM 202, a Configuration Model (CM) 204 is created at 221. The CM 204 is composed of information related to the building of all the non-functional parts of the application, including aspects such as: name or description of the application, icons and logos, or company information. An important difference between these two elements is that the CM will be used to generate the applications and as such is part of the deployed applications, while the ABM, that defines the application behavior, will be deployed on the web (or cloud) and will only be received by applications at runtime.

At 222 of FIG. 3, modelling of generation instructions is performed when specifying various generation aspects. For this task, the application designer L3 uses a generator modeler (GM) 133 forming part of system 132. This allows specification of aspects needed in the generation procedure: engine endpoints, version number, target platform(s), as well as specific aspects of the target platforms. However, several of the elements to model are optional, with just the client device(s) or platform(s) being mandatory. The output of the generator modeler 133 is the Generation Model (GMo) 206.

Figure 14:
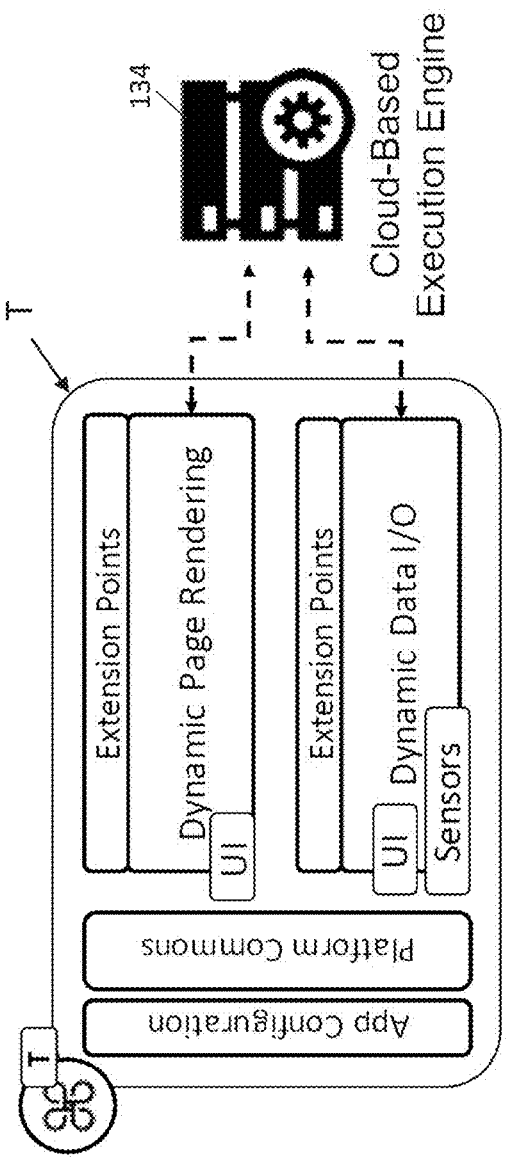
FIG. 14 is a schematic, diagrammatic view of a typical application template.

At 223 of FIG. 3, an application template 148 is selected from application template repository (TR) 150, the application template 148 corresponding to the client device 106 specified by Generation Model (GMo) 206. Generally, operations at 223, along with operations at 224, 225, and 226, are performed automatically. Referring to FIG. 14, the underlying composition of each one of the application templates is illustrated by typical application template T. Each application template T includes generic program code for the target platform with the generic program code containing basic functionalities required to execute the client application.

The generic program code shown in FIG. 14 includes: (1) dynamic page rendering, (2) dynamic data I/O, and (3) platform commons. The dynamic page rendering contains functionality to receive the application modelled in the ABM, instantiate it and decide how to interact with the end-user according to the patterns of the target platform. The dynamic I/O contains functionality needed for the interaction with the cloud-based based execution engine 134 in order to display information and collect data from the device and the end user as well as general functionality needed for the application execution mechanism. The platform commons facilitates access to the platform-specific operations. The application template code (including, for instance, API endpoint(s), app ID, logo(s) and app description) comprises files to be generated and placeholders requiring instantiation.

Figure 15:
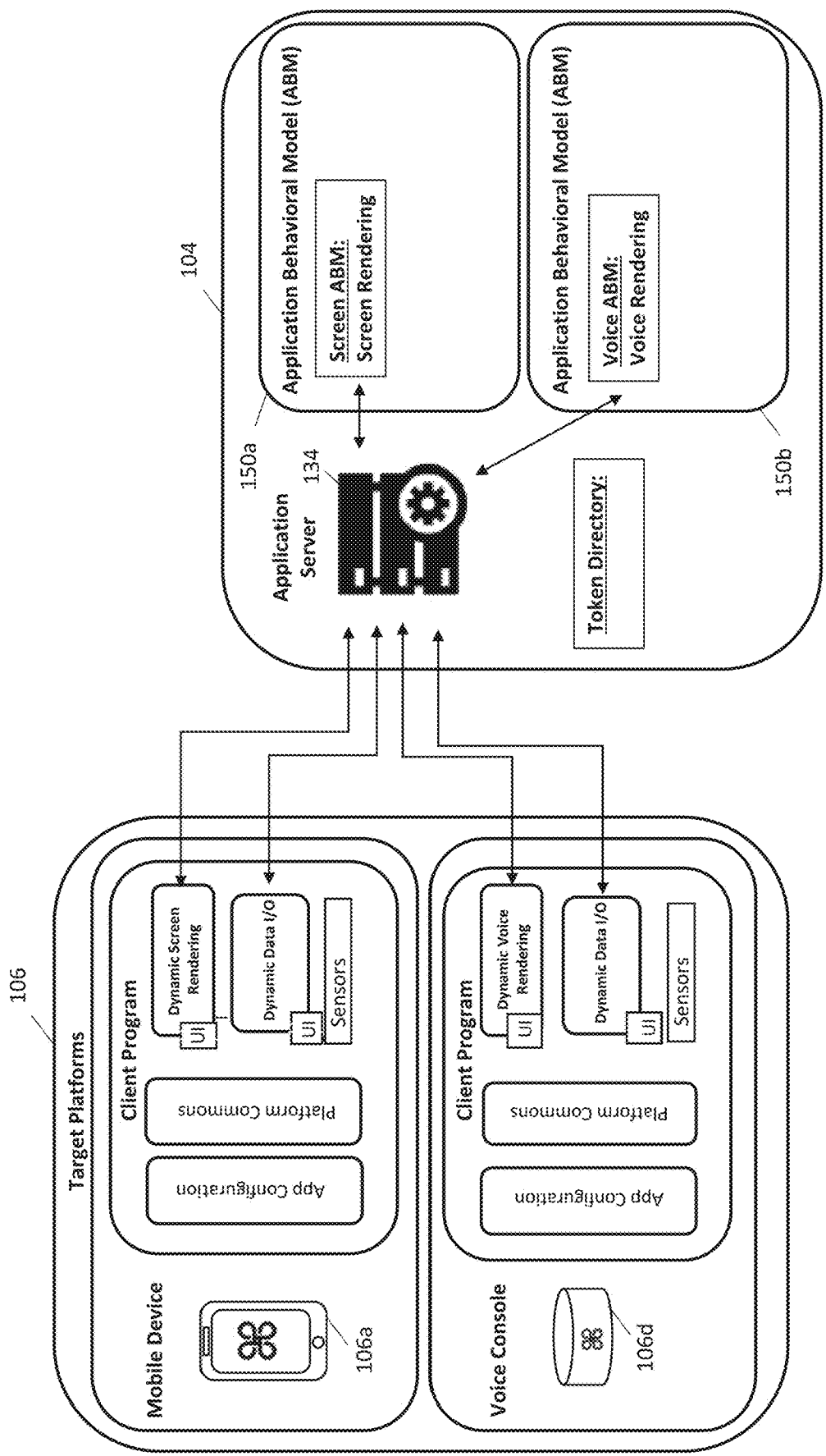
FIG. 15 is a schematic, diagrammatic view of two application templates usable with the system of FIG. 1.

Flexibility is provided at 223 in FIG. 3 by varying the functional capabilities of the application templates to accommodate for the specific functional capabilities of the client devices 106. Referring to FIG. 15, two exemplary application templates 150a and 150b are shown. In accordance with one disclosed aspect of the present approach, application 150a would be selected at 223 in FIG. 3 when the client device 106 is screen based, while application template 150b would be selected when the client device 106 is voice based. Additionally, the dynamic page rendering and dynamic data I/O elements could be customized after the application is generated through use of their extension points.

In one example of instantiating an application template, certain placeholders are filled with correct information in the App Configuration module (shown in FIG. 14 and FIG. 15), including the endpoint of the engine or the application token that identifies the application.

At 224 of FIG. 3, the ABM 202 is provisioned on the execution engine 134. This implies the creation of an application space for the management of the required datastores, flows and services that the application will need to execute, as well as for storing the ABM 202, that will be sent to a pre-selected client device 106 at execution or runtime. Once this is done, an application token 208, corresponding with the pre-selected client device 106, will be returned that will uniquely identify the client application 102 on the distribution server 152 (FIG. 1).

At 225 of FIG. 3, the application template is instantiated, which includes both filling in the template selected at 224 and producing program code 210 for the selected target platform. To this end, the information from both the Configuration Model (CM) 204 and Generation Model (GMo) 206 are used. Actions performed at 225 of FIG. 3 depend on the requirements of the target platform and corresponding application template. In general, at 225 of FIG. 3, the name of the application as well as the description or logos and the application token 208 will be injected in the App Configuration (shown in FIG. 14 and FIG. 15) of the application template.

At 226 of FIG. 3, post-processing of the generated program code 211 is performed in order to generate the artefacts that are directly executable by the target platform 106. What post-processing is performed at 226 of FIG. 3 depends on the target platform requirements. For instance, for iOS based target platforms, Xcode builder is invoked in order to generate an .ipa file. Similar such actions are executed for voice-based platforms such as Amazon Alexa. For browser-based applications this step can include invoking a yarn script in order to manage all possible dependencies.

After the client application 102 is generated, it should be made available to end users L4. Naturally, this varies with the target platform: Apple App Store and Google Play are well known for iOS and Android applications and they require certain conditions to be met when deploying an application there. These conditions could be part of an enterprise agreement to allow newly generated client applications to be automatically deployed.

In addition, since a deployed client application can be downloaded once and updated on the cloud at any time, certain application designers L3 may choose to take a different strategy. For instance, an application designer could propose a single client application to be downloaded only once. Subsequently, functionalities could be added to the client application 102 by adding pages and actions at any time, without end users L4 having to update it.

C. Application Execution (M2)

The mechanism for M2 includes (1) page-rendering/navigation (i.e., determining how the application retrieves the ABM from the application server 104 (FIG. 1) and renders pages [collections of actions] (FIGS. 16A and 16B)), and (2) action execution (i.e., determining how actions are executed execution engine 134, the interactions within the application, as well as the rendering policies for I/O operations (FIG. 18)).

Turning to FIGS. 1 and 16, one example of a method for executing the application includes the following steps:

Initially, at 154, one of the client devices 106, such as mobile 106*a*, sends a token to the application server 104 (request 156) for retrieving a copy of the ABM suitable for use with the target platform of the client device 106. Once the application server 104 receives request 156, the application engine 134 extracts the token contained in the request, finds the space associated with this token in memory, and sends the corresponding ABM 158 to the target platform of the client device 106. As mentioned above, the ABM 158 includes information regarding generation of pages, page navigation, suggested layout for screen based platform actions, and everything about the contents of the application, but nothing about the exact ways of rendering them.

As will be appreciated, request 156, among other actions, is implemented with a client program corresponding with the client application 102 of the target platform of the client device 106. The client application 102 may be downloaded by a target platform of the client device 106 over network 110 from the distribution server 152 and stored in memory of the target platform of the client device 106. Thanks to this dynamic retrieval of the ABM, the end user L4 always benefits from an up-to-date version of the ABM. No manual update of the ABM has to be performed by the end user L4.

Figure 12:
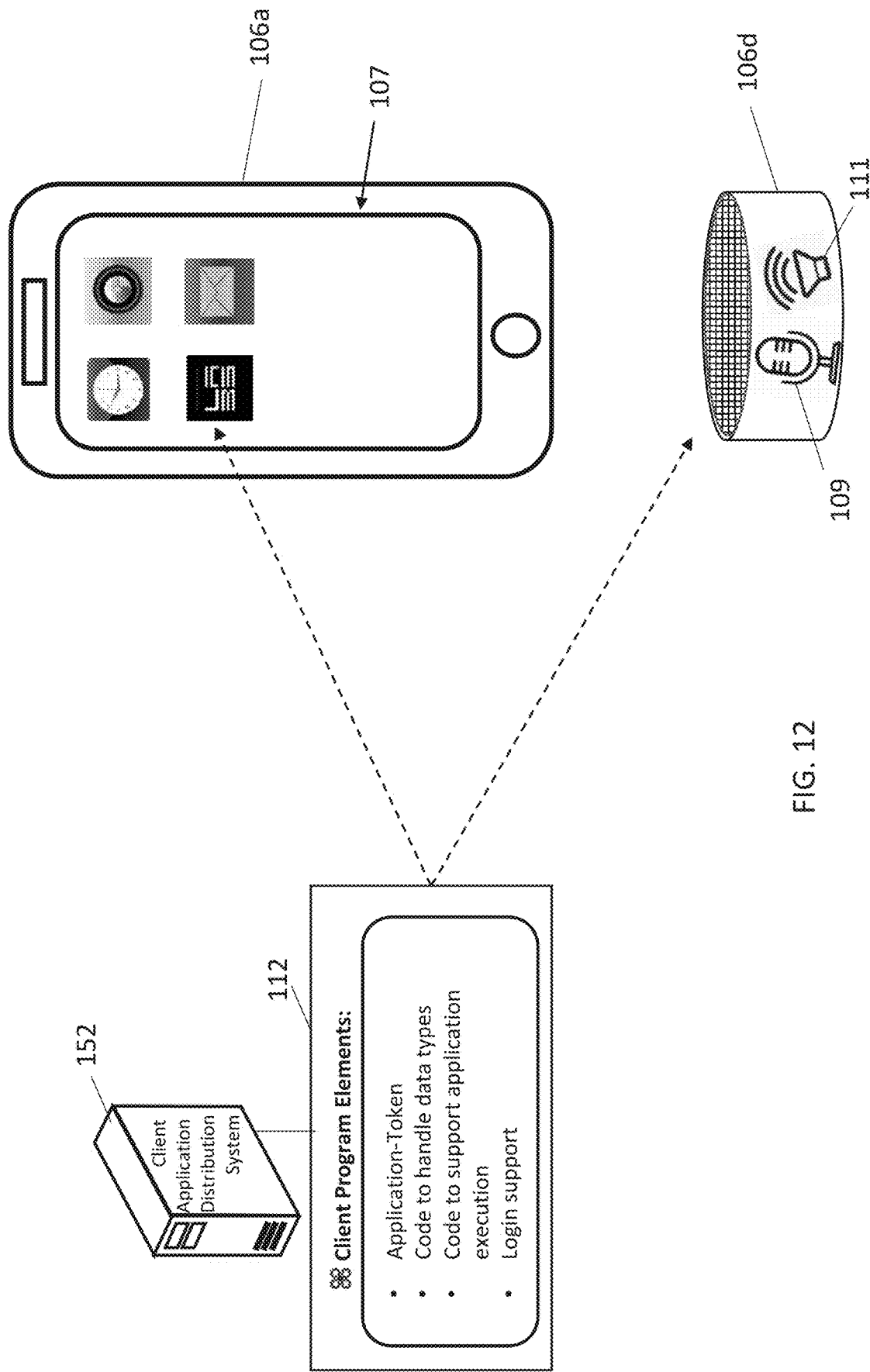
FIG. 12 is a schematic, diagrammatic view of a client application distribution system communicating with two different types of client devices.

As disclosed with reference to FIG. 12, the graphical rendering process is executed locally at the target platform and the graphical element is displayed by the screen of the target platform (e.g., for client device 106*a*). Alternatively, the output element may be an audio element to be output by a speaker. In this case, an audio rendering process is executed locally at the target platform then the speaker produces an audio signal corresponding to the audio element (e.g., for client device 106*d*).

Figure 16A:
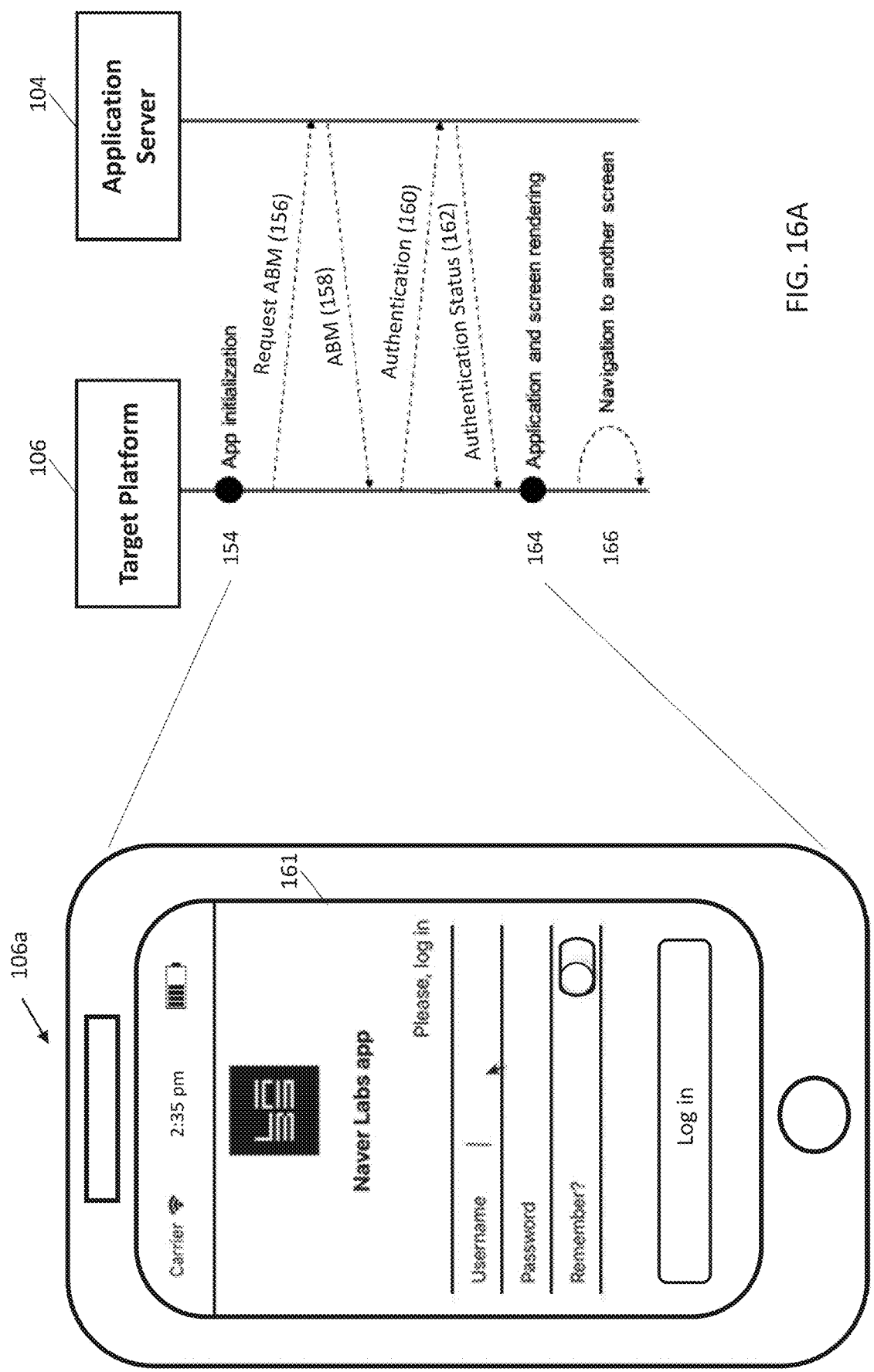

Referring to FIG. 16A, if the application requires an authentication and if the application is not started for the first time since its installation, the first page 161 may assume the form of a login page inviting the end user to input credentials, such as a username and a password. The credentials input by the end user L4 are then sent at 160 to the application server 104 and then compared with the credentials stored in the memory of the application server. If the compared credentials match, the end user L4 is authorized at 162 to participate in application execution at 164. If the compared credentials mismatch, the end user L4 is not authorized at 162 to use the application at 164.

Figure 16B:
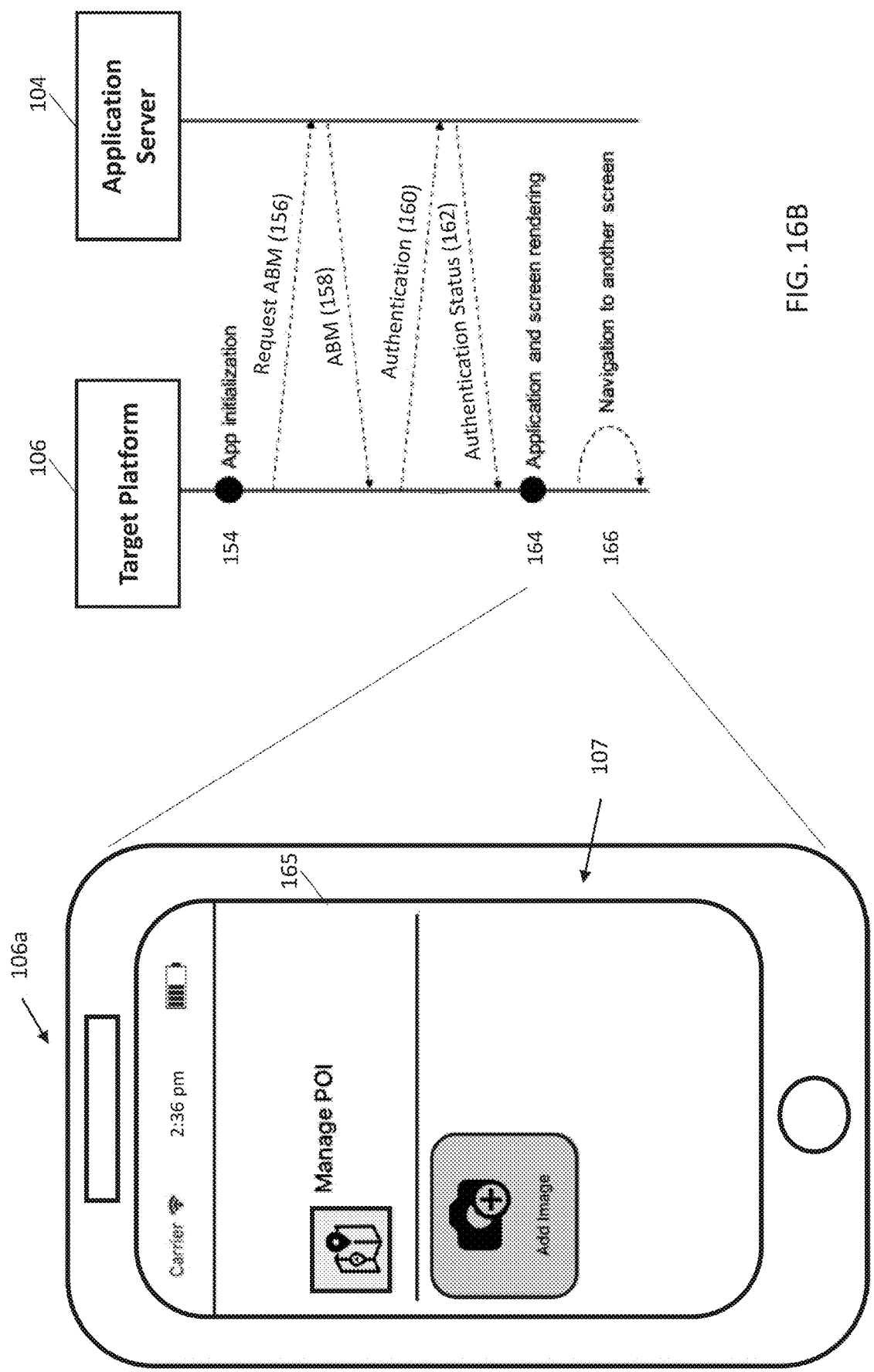

Referring to FIG. 16B, the client program reads the ABM at 164 to identify a home page 165 of the application to be rendered. Once the home page 165 is identified, the client program renders the page and the page is displayed. As follows from the description above, for a voice-based target platform, rendering of the home page may include synthesizing of voice for the sake of outputting information and possible actions to an end user. In addition to rendering a page, the end user may navigate to another page at 166. The subsequent page to render at 166 is modelled in the ABM, so that once that page is detected, it is rendered and presented to the end user.

Figure 17:
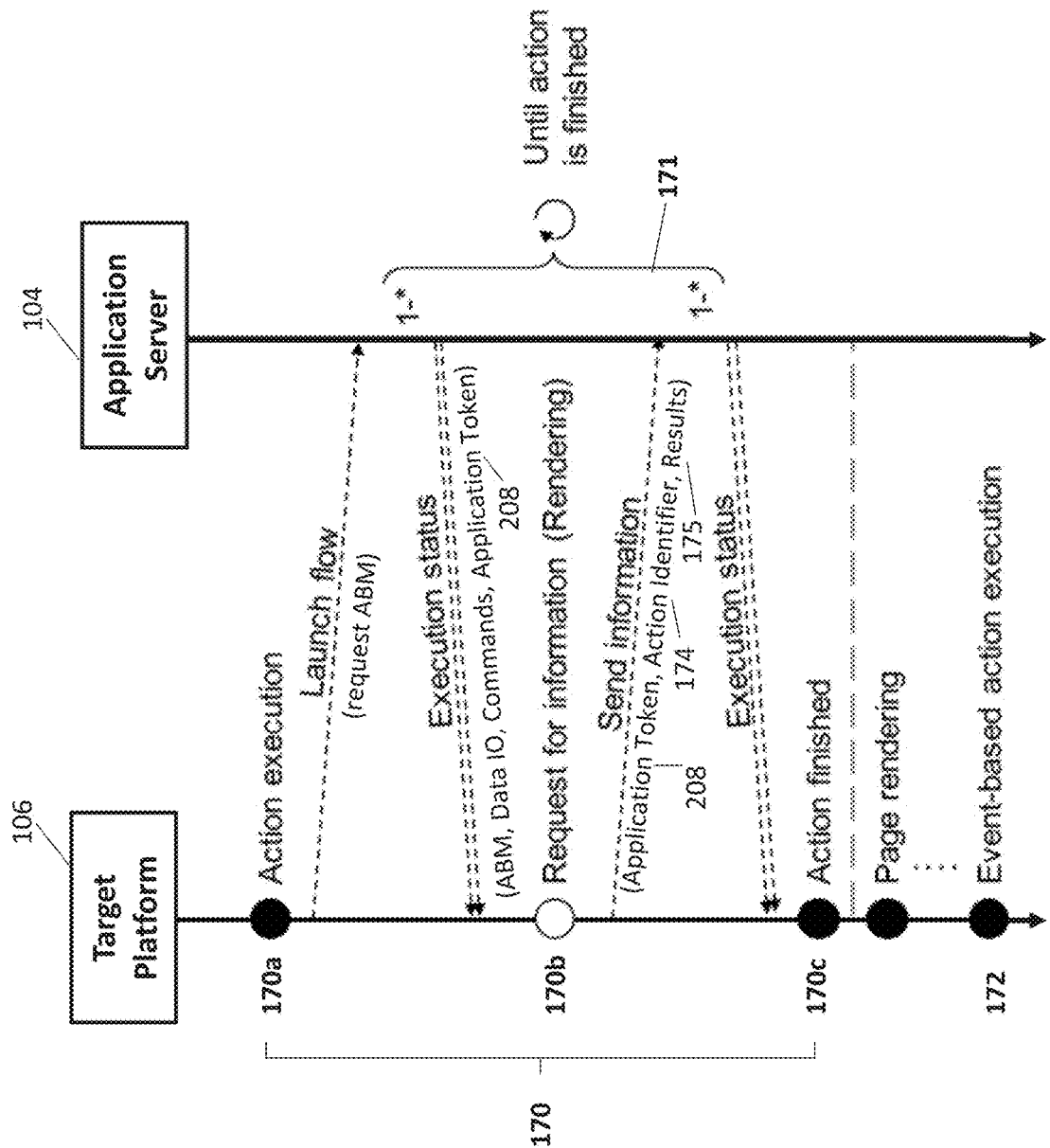
FIG. 17 illustrates a schematic flow diagram corresponding with action/event execution performed pursuant to application execution.

Referring now to FIG. 17, some further description regarding action execution mechanism 170 is provided. Per action execution at 170*a*, flow execution on the application server 104 (by way of execution engine 134) is invoked. From that moment on the client program of the target platform of a client device 106 waits for instructions at 107*b*. The kind of instructions that the application server 104 can send to the target platform 106 while an action is being executed include: (1) Data IO: request for data that need to be provided by the end user, or collected from the devices of the target platform (e.g. Global Positioning System (GPS)

position), as well as information that needs to be shown to the end user (or sent to the client device); and (2) Commands: informing the target platform about the status of the execution or some other event. With the instruction includes an Application Token 208 uniquely identify the client application. For instance in one embodiment, EXECUTION_FINALIZED is sent once the execution is finalized at the application server 104, while PAGE_UNBLOCK is sent when the execution is not finished, but does not require more information, thus signaling that the previous page can be rendered.

If a data IO request arrives to the application (at 170*b* in FIG. 17), the client program (instantiated template) decides how to manage it. This can range from simple rendering of a data input field, to adaptive data binding based on device characteristics and permissions. For instance, if the execution engine 134 (FIG. 1A) requests the GPS location from a web-based target application, the application code can choose to show a map to allow the end user to specify a location, or alternatively use features of a browser to discover it. Conversely, if the application is a mobile application with location settings allowing access to the GPS, the device can decide to just send the location, without user intervention, therefore without rendering any input field.

Since the disclosed adaptive IO management approach affords contextual data binding, such approach contrasts with approaches where designers design a form to be used for user interaction. In the same way, if the request involves showing data to the end user, the information is sent in an abstract way, and it is the responsibility of the client application to render it. As such, the rendering will be different on a screen-based device from that of a voice-based device.

Referring again to FIG. 17, by way of communication at 170*b*, information may be sent to the application server 104 by a target platform 106 concerning an instruction performed at the target platform. Such information may include, an Application Token 208 uniquely identify the client application, an Action Identifier 174 identifying the instruction, and any Results 175 produced by the instruction. In an embodiment, once the action identifier is sent to the application server 104 indicating that an instruction is performed (e.g., to display a first page that request data), the target platform may continue executing the application in accordance with the flow defined in the ABM (e.g., to display a second page that requests other data) independent of the application server 104.

The application server 104, upon receiving such information (including, the application token 208, the action identifier 174 identifying an instruction, and any results 175 produced after performing the instruction), may perform using the application execution engine 134 a sequence of processing steps and thereafter inform the target platform 106, by way of communication at 170*b*, that a given action has been completed, or that no more interaction is required at 170*c*. Accordingly, the target platform 106 may, in one example, render the home page or revert to other predefined behavior in accordance with the flow defined in the ABM associated with the application.

As further reflected at 172 in FIG. 17, another type of launch, which is event based (as opposed to user initiated), is possible. The mechanism of 172 is similar to the mechanism of 171, except the action is automatically launched by the application of the target platform, without human participation.

Elaborating further on event-based launch at 172, as indicated above, a first type of event which may occur at the target platform is a user input provided the end user L4 at the user interface. This user input is, for instance a user action, on a graphical element displayed on the screen 107 of the target platform of mobile device 106*a* (FIG. 12) or a vocal command captured by a microphone 109 of the target platform of voice console 106*d* (FIG. 12). A second type of event may be detected by a hardware component of the target platform without human participation; for instance, whenever the geolocation means detect that the target platforms has reach some predetermined location.

Whenever the client program detects an event has occurred at the target platform, the client program determines whether this event is associated to a process or a target page in the ABM. If the event happens to be associated to an output element of a target page, the client program locally renders the determined output element. It is to be noted the application server 104 is not involved in this rendering.

Basically, an event associated with a page of the target platform (i.e., a target page) may be detected as a result of the end user L4 clicking on or selecting a particular button of a source page. Thanks to this mechanism, the end user can navigate through different pages of the application without involving the application server 104. Rendering pages with the client program is the responsibility of the target platform. The ABM contains just a representation, but based on the features of the target platform, the generated client program provides a proper rendering.

Once an event-based action at 172 is completed, the target platform 106 notifies the application server 104 similar to the mechanism of 171 (e.g., by sending the application server 104 the application token 208, the action identifier 174 identifying an instruction, and any results 175 produced after performing the instruction).

The method of defining and generating an application (M1) has the following advantages:

(a) Extensible: This mechanism can be used to generate program code for any platform with no change in strategy. Adding support for a new platform simply involves adding a template.

(b) Codeless approach: The modelling is based on a graphical editor, and the behavior actions are available in the domain store. Therefore, the application designer L3 is not required to manage complex concepts.

(c) Native interaction: Since the generation is template-based, the generated applications are native to the client device, therefore they have full access to all the features of the target platform including capabilities and sensors of the client device, providing a natural way to interact with the user environment as part of the data exchange with the application. Since the same application logic is shared by all platforms, the same application would perform the same functionality while adapting consistently to the device. For instance, on screen-based platforms, the applications would use the screen to interact with the end user, while on voice-based platforms it would use automatic speech recognition, text-to-speech, and other such functionalities to fulfil the data input and output needs of flow activities.

(d) Light-weight applications: The generated client program, besides standard boilerplate code, may simply contain the minimal functionality to communicate with the application server as well as branding and descriptions. As an example, a typical generated iOS 11.4 application would take less than 20 MB on the device, while for Android 8.1 the memory required drops to as low as 10 MB.

(e) Efficient generation mechanism: Since the ABM and actual behavior are not part of the generated client program, the generation of the client program is streamlined and need only be executed once, regardless of subsequent updates focusing on behavior changes.

The application execution method (M2) has the following advantages:

(a) Hot changes: If the processes (i.e., flows) change no update or reinstallation of a client program is required.

(b) Automatic updates for all devices at once: The execution mechanism enables easy maintenance of client programs. On one hand, if an application definition changes, all the client applications will receive the new ABM, so all the client applications will be automatically updated. On the other hand, if the behavior of any action changes, the client applications will receive different instructions from the execution engine, therefore they will be automatically updated.

(c) Adaptation to the target platform: The client program is responsible to render everything properly, therefore it is possible to ensure an optimal representation on any device.

(d) Contextual integration: Thanks to dynamic binding of data elements, the human intervention can be minimized, and data can come from different sources and sensors.

(e) Execution on the application server: The execution of processes (i.e., flows) is fully executed at the server side, thus preventing loss of information and permitting centralized monitoring and control.

(f) Multi device: Owing to cloud-based execution, various devices can play a role during the flow execution, and the engine can decide to obtain information from the appropriate device for each task. For instance, if a GPS location is required pursuant to a user navigating in a web browser and the end user's mobile device is available, the execution engine can retrieve the location from the mobile application assuming the mobile device possesses a suitable sensor. Also, when using a voice interface at a first device, if a picture is required, the execution engine can request the intervention of a second (camera-equipped) device, just for the requirement(s) of a particular action, continuing seamlessly on the first device once the picture is obtained from the second device. The present disclosure further contemplates a case with multiple devices where the end user could switch between them during flow execution, based on convenience of device availability.

Also, because database support is provided on the server side, the back-end monitoring and control system can access the data managed by the applications. This is important when there is a need to update missing information, restore application instances with in-consistent states, or overwrite user input if incorrect.

For instance, in a ticket booking application (see more details of the example in the '429 Appendix), if something fails, an administrator can continue the booking in the administration tool, essentially running the application steps in the administrative console, starting from the last executed point on the client device (with the corresponding data values).

Referring again to FIG. 1, some of the actions that can be performed with the application monitoring & control system 140 at the back end of system 100 include:

Monitor the end users that are using the application;
Disable or block application executions to certain users;
Create/Update/Delete users;
Observe the actions performed by the end users;
Cancel actions under execution;
Continue blocked actions; and/or
Leverage dashboards to analyses business data.

In addition, one of the most important actions that can be performed is to update the ABM, for instance to add/remove features from the application or change the behavior of the application. The behavior of the application is automatically updated to all the running instances, without the need to reinstall the client program or any processes on a target platform.

In the embodiment described above, the ABM is downloaded dynamically in the target platform, and the client program uses it to determine an output element or a process associated to an event that occurred at the target platform. This mechanism is simpler to implement than having the ABM managed at the server side. In particular, it allows the target platform to render target pages locally without involving the application server.

Nonetheless, in another embodiment, the ABM would remain at the server side during application execution. In this other embodiment, each event occurring at the target platform would be communicated to the application server. Responsive to determining the event corresponds with a process in the ABM, the application server would execute the corresponding process.

D. General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in program code of computer programs. The functional blocks, flowchart components, and other elements described above serve as software specifications, which may be translated into program code of the computer programs by the routine work of a skilled technician or programmer.

The program code of the computer programs include processor-executable instructions that are stored on at least one non-transitory, tangible computer-readable medium. The program code of the computer programs may also include or rely on stored data. The program code of the computer programs may encompass a basic input/output system (BIOS) that interacts with hardware of the special purpose computer, device drivers that interact with particular devices of the special purpose computer, one or more operating systems, user applications, background services, background applications, etc.

The program code of the computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art and are also intended to be encompassed by the following claims.

What is claimed is:

1. A method for generating an application for use by an end user, the end user being associated with at least one of a first device and a second device where the at least one of the first device and the second device possess respective functional capability sets, comprising:
producing an application behavior model (ABM), the ABM including information regarding organization of the application and actions available for request by the end user;
storing the ABM in an application server, the application server including an application execution engine;
the application server communicating remotely with the at least one of the first device and the second device to which the end user is associated, wherein the ABM is made available to the at least one of the first device and the second device to which the end user is associated when the application is to be executed;
producing instructions for modelling one or more aspects of generating a client application, said producing of the instructions for modelling including providing a Generation Model output (GMo) where the GMo corresponds with the at least one of the first device and the second device to which the end user is associated;
using the GMo to select an application template from a repository including a first application template and a second application template, the first and second application templates corresponding respectively with the first and second devices, wherein the functional capability set of the first device differs from the functional capability set of the second device, and wherein the first application template is configured to accommodate for the functional capability set of the first device and the second application template is configured to accommodate for the functional capability set of the second device;
instantiating the selected one of the first and second application templates to produce program code, the program code corresponding with a client application;
wherein the program code of the client application, which is launchable at the at least one of the first device and the second device to which the end user is associated, permits selected input to be communicated from the at least one of the first device and the second device to which the end user is associated to the application server in accordance with the ABM;
and wherein, responsive to receiving the selected input from the at least one of the first device and second device to which the end user is associated, a sequence of processing steps is performed by the application execution engine.

2. The method of claim 1, where the application execution engine is associated with a flow to be implemented during execution of the application and where the ABM does not contain any code instructions relating to the flow, wherein said producing the ABM includes providing the ABM with at least one reference to the flow.

3. The method of claim 1, wherein said producing the ABM includes providing the ABM with data corresponding with output elements to be rendered at the at least one of the first device and the second device.

4. The method of claim 1, where the end user may or may not have access to a screen, wherein the first application template is configured to interact with an end user having a screen and the second application template is configured to interact with an end user lacking access to a screen.

5. The method of claim 4, where the second application template is selected from the repository, wherein the second application template is configured to communicate with the at least one of the first device and second device by way of speech related input/output.

6. The method of claim 1, further comprising
producing a set of information associated with building all non-functional parts of the client application, wherein said instantiating the selected one of the first and second application templates further comprises instantiating the set of information to produce the program code.

7. The method of claim 1, further comprising:
post processing the program code in order to generate the client application; and
making the generated client application available to the at least one of the first device and the second device.

8. The method of claim 1, where the ABM comprises a first behavior model (ABM1) with ABM1 including first content, the content including information regarding organization of the application and actions available to the end user, further comprising:

producing a second application behavior model (ABM2) where the ABM2 includes second content, the second content including information regarding organization of the application and actions available to the end user, wherein at least part of the first content differs from at least part of the second content; and wherein, when the end user requests an ABM, ABM2, rather than ABM1, is made available to the at least one of the first client device and the second client device to which the end user is associated.

9. The method of claim 1, further comprising creating, a token with the application execution engine, the token indicating a memory location at which the ABM is stored and wherein said instantiating the selected one of the first and second application templates includes embedding the token in the program code so that it is included in the client application for use by the end user.

10. The method of claim 1, further comprising:
receiving an action identifier at the application server; and
responsive to receiving the action identifier, performing the sequence of processing steps with the application execution engine.

11. The method of claim 1, wherein, pursuant to performing the sequence of processing steps at the application execution engine, the application execution engine obtains further selected information from the at least one of the first device and the second device to facilitate said performance of the sequence of processing steps.

12. The method of claim 11, where the at least one of the first device and the second device includes or is associated with a data collection subsystem, wherein the further selected information is obtained from the data collection subsystem.

13. The method of claim 1, wherein, pursuant performing the sequence of processing steps at the application execution engine application, the application execution engine apprises the at least one of the first device and the second device with status information regarding said performance of the sequence of processing steps.

14. The method of claim 1, where database support is provided for the application server, further comprising monitoring, controlling and updating behavior of the application server with the database support.

* * * * *